US012647552B2

(12) United States Patent
Wang et al.

(10) Patent No.: US 12,647,552 B2
(45) Date of Patent: Jun. 2, 2026

(54) DISPLAY PANEL, DISPLAY APPARATUS AND DRIVING METHOD THEREFOR, AND IMAGE RENDERING METHOD

(71) Applicant: BOE Technology Group Co., Ltd., Beijing (CN)

(72) Inventors: Tieshi Wang, Beijing (CN); Kuanjun Peng, Beijing (CN); Xue Dong, Beijing (CN); Chunmiao Zhou, Beijing (CN); Tao Hong, Beijing (CN); Hui Zhang, Beijing (CN); Xin Duan, Beijing (CN); Minglei Chu, Beijing (CN); Xiaochuan Chen, Beijing (CN); Guangcai Yuan, Beijing (CN); Jing Yu, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 312 days.

(21) Appl. No.: 18/546,289

(22) PCT Filed: Aug. 27, 2021

(86) PCT No.: PCT/CN2021/115150
§ 371 (c)(1),
(2) Date: Aug. 14, 2023

(87) PCT Pub. No.: WO2023/024112
PCT Pub. Date: Mar. 2, 2023

(65) Prior Publication Data
US 2024/0137484 A1     Apr. 25, 2024

(51) Int. Cl.
*H04N 13/383*     (2018.01)
*G09G 3/36*     (2006.01)
(Continued)

(52) U.S. Cl.
CPC ......... *H04N 13/383* (2018.05); *G09G 3/3607* (2013.01); *H04N 13/246* (2018.05);
(Continued)

(58) Field of Classification Search
CPC .. H04N 13/383; H04N 13/246; H04N 13/332; H04N 13/296; H04N 13/398;
(Continued)

(56) References Cited

U.S. PATENT DOCUMENTS 7,920,154 B2     4/2011  Brown Elliott et al.
2003/0071576 A1     4/2003  Koyama
(Continued)

FOREIGN PATENT DOCUMENTS

CN        101636676 A     1/2010
CN        104732928 A     6/2015
(Continued)

OTHER PUBLICATIONS

Japanese Office Action, mailed Aug. 12, 2025, from Japanese Patent Application No. 2023-549680, 18 pages.
(Continued)

*Primary Examiner* — Xin Sheng
(74) *Attorney, Agent, or Firm* — Workman Nydegger

(57)        ABSTRACT

A display panel includes: a first base substrate; a plurality of scanning lines, which are located on one side of the first base substrate, extend in a first direction and are arranged in a second direction, wherein the first direction intersects with the second direction; a plurality of data lines, which are located on the same side of the first base substrate as the scanning lines, extend in the second direction and are arranged in the first direction; and a plurality of sub-pixels, which are respectively located in regions divided by the plurality of scanning lines and the plurality of data lines, wherein the plurality of sub-pixels constitute a plurality of
(Continued)

pixel islands, the plurality of pixel islands are dived into a plurality of control regions, each control region comprises at least one pixel island, and each control region is independently driven to emit light.

19 Claims, 24 Drawing Sheets

(51) Int. Cl.

| | | |
|---|---|---|
| *H04N 13/246* | (2018.01) | |
| *H04N 13/296* | (2018.01) | |
| *H04N 13/332* | (2018.01) | |
| *H04N 13/398* | (2018.01) | |

(52) U.S. Cl.
CPC ......... *H04N 13/296* (2018.05); *H04N 13/332* (2018.05); *H04N 13/398* (2018.05); *G09G 2300/0452* (2013.01); *G09G 2300/0804* (2013.01); *G09G 2310/0283* (2013.01); *G09G 2310/0286* (2013.01); *G09G 2354/00* (2013.01)

(58) Field of Classification Search
CPC ......... G09G 3/3607; G09G 2300/0452; G09G 2300/0804; G09G 2310/0283; G09G 2310/0286; G09G 2354/00
See application file for complete search history.

(56) References Cited

U.S. PATENT DOCUMENTS

| | | | | |
|---|---|---|---|---|
| 2004/0120571 | A1* | 6/2004 | Duvdevani | .......... G06V 10/469 |
| | | | | 382/149 |
| 2008/0049047 | A1 | 2/2008 | Credelle et al. | |
| 2010/0315319 | A1 | 12/2010 | Cok et al. | |
| 2013/0033466 | A1* | 2/2013 | Uehara | ............. G02F 1/133526 |
| | | | | 345/204 |

| | | | | |
|---|---|---|---|---|
| 2015/0379947 | A1 | 12/2015 | Sang et al. | |
| 2017/0069252 | A1 | 3/2017 | Guo et al. | |
| 2017/0193893 | A1* | 7/2017 | Lee | ...................... H10D 86/471 |
| 2017/0287381 | A1* | 10/2017 | Park | ................... G02F 1/13454 |
| 2018/0366068 | A1* | 12/2018 | Liu | ...................... G06V 40/171 |
| 2019/0130848 | A1 | 5/2019 | Kim et al. | |
| 2019/0172399 | A1 | 6/2019 | Chen et al. | |
| 2019/0279574 | A1 | 9/2019 | Kim et al. | |
| 2020/0111422 | A1 | 4/2020 | Park | |
| 2020/0118476 | A1* | 4/2020 | Kim | ................... G09G 3/2003 |
| 2021/0057493 | A1 | 2/2021 | Liu et al. | |
| 2021/0066625 | A1 | 3/2021 | Tian et al. | |
| 2021/0132693 | A1 | 5/2021 | Pulli et al. | |
| 2022/0366819 | A1 | 11/2022 | Gao et al. | |

FOREIGN PATENT DOCUMENTS

| | | | | |
|---|---|---|---|---|
| CN | 107274844 | A | 10/2017 | |
| CN | 108878486 | A * | 11/2018 | .......... H10D 86/411 |
| CN | 109036246 | A | 12/2018 | |
| CN | 110459577 | A | 11/2019 | |
| CN | 110504291 | A | 11/2019 | |
| CN | 111009215 | A | 4/2020 | |
| CN | 111766716 | A | 10/2020 | |
| CN | 112929647 | A | 6/2021 | |
| GB | 2563960 | A | 1/2019 | |
| JP | 2009063952 | A | 3/2009 | |
| JP | 2017120401 | A | 7/2017 | |
| JP | 2017187762 | A | 10/2017 | |
| JP | 2020021083 | A | 2/2020 | |
| WO | 2021087450 | A1 | 5/2021 | |

OTHER PUBLICATIONS

Extended European Search Report, mailed Apr. 4, 2024, from EP Application No. 21954635.5, 13 pages.
International Search Report, mailed May 26, 2022, from PCT/CN2021/115150, 4 pages.
Chinese First Office Action, mailed Mar. 27, 2026, from China Patent Application No. 202180002313.9, 24 pages.

* cited by examiner 51   43

Human-eyes moving

44

40

Determining a user's gaze zone and non-gaze zone on the display panel in real time

S101

Driving independently control zones corresponding to the gaze zone to perform image display with a first resolution, and driving control zones corresponding to the non-gaze zone to perform image display with a second resolution

S102

CLK CLK CLK CLK CLK CLK CLK CLK
1    2    3    4    5    6    7    8

STV

GOA1

GOA2

GOA3

GOA4

GOA5

GOA6

GOA7

GOA8

GOA9

GOA10

GOA11

GOA12

Fig. 30

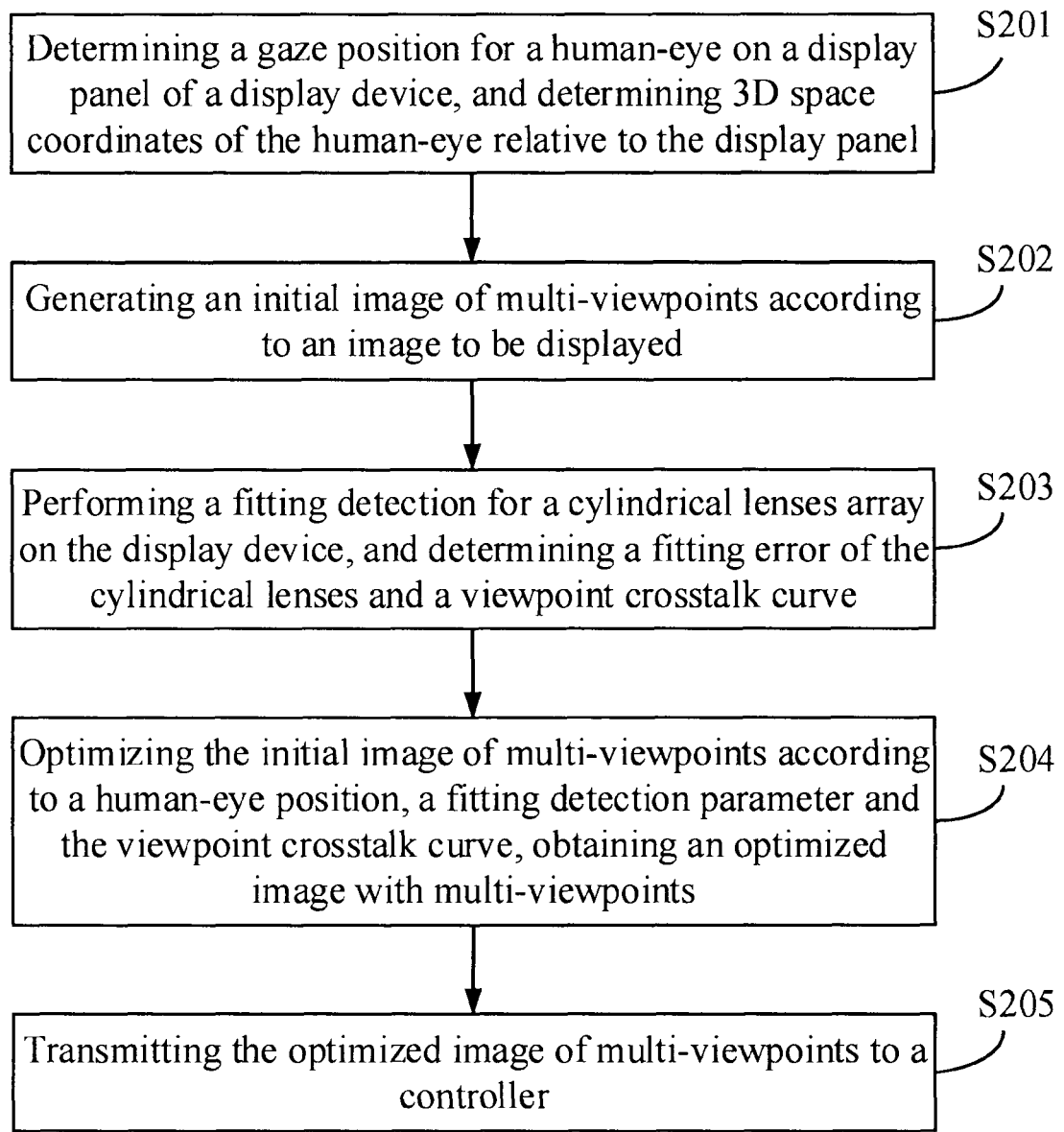

Determining a gaze position for a human-eye on a display panel of a display device, and determining 3D space coordinates of the human-eye relative to the display panel — S201

Generating an initial image of multi-viewpoints according to an image to be displayed — S202

Performing a fitting detection for a cylindrical lenses array on the display device, and determining a fitting error of the cylindrical lenses and a viewpoint crosstalk curve — S203

Optimizing the initial image of multi-viewpoints according to a human-eye position, a fitting detection parameter and the viewpoint crosstalk curve, obtaining an optimized image with multi-viewpoints — S204

Transmitting the optimized image of multi-viewpoints to a controller — S205

Fig. 33

DISPLAY PANEL, DISPLAY APPARATUS AND DRIVING METHOD THEREFOR, AND IMAGE RENDERING METHOD

CROSS REFERENCE TO RELATED APPLICATIONS

This application is a national phase entry under 35 U.S.C. § 371 of International Application No. PCT/CN2021/115150, filed on Aug. 27, 2021, the entire content of which is incorporated herein by reference.

TECHNICAL FIELD

The present disclosure relates to the technical field of display, and in particular to a display panel, a display apparatus and driving method therefor, and an image rendering method.

BACKGROUND

As the display technique continuously developing, the Three Dimensional, 3D display technique has been given much more attention. The 3D display technique enables display images to be solid and lifelike. The theory of the 3D display technique is in that receiving left-eye images and right-eye images of a certain parallax by human's left and right eyes; after receiving two parallax images respectively by the human's left and right eyes, obtaining a 3D visual display effect by superposing and merging image information via human's brain. To enable Super-Multi Viewpoints (SMV) 3D display to be compatible with a light field display, the conventional sub-pixels are made in a pixel island structure, each of which includes a plurality of sub-pixels. A common light field display can be realized when the plurality of sub-pixels have different display information and multiple viewpoints enter into a single eye, and a SMV 3D display can be realized when the plurality of sub-pixels have different display information and a single viewpoint enters into a single eye.

However, as resolutions of display panels being improved, there are some problems occurred in display products, such as low aperture ratio, high power consumption and etc.

SUMMARY

Some embodiments of the present disclosure provide a display panel. The display panel includes: a first substrate; a plurality of scanning lines arranged on a side of the first substrate, the plurality of scanning lines extending in a first direction and being arranged in a second direction, and the first direction intersecting with the second direction; a plurality of data lines arranged on the side of the first substrate where the plurality of scanning lines are, and the plurality of data lines extending in the second direction and being arranged in the first direction; a plurality of sub-pixels arranged in zones divided by the plurality of scanning lines and the plurality of data lines. The plurality of sub-pixels constitute a plurality of pixel islands, the plurality of pixel islands are divided into a plurality of control zones, each of the plurality of control zones includes at least one pixel island, and each of the plurality of control zones is independently driven to emit light.

In some embodiments, the display panel further includes: a plurality of scanning signal input lines corresponding to the scanning lines in an one-to-one manner, and the plurality of scanning lines extending in the first direction and being arranged in second direction; a plurality of control signal lines extending in the first direction; a plurality of fixed potential lines; and a plurality of control circuits arranged between adjacent sub-pixels. Each pixel island is connected with at least n control circuits of the plurality of control circuits, n is a quantity of sub-pixel rows comprised in the each pixel island, and one of the n control circuits correspond to one of the sub-pixel rows of the each pixel island. The control circuit is configured to transmit a signal from the scanning signal input line or a signal from the fixed potential line to the scanning line. At least a part of the plurality of control signal lines includes a plurality of portions extending in the second direction and a plurality of portions extending in the first direction, and the portions extending in the second direction and the portions extending in the first direction are in connection and in an alternating arrangement.

In some embodiments, each of the control circuits includes: a first transistor and a second transistor. A control end of the first transistor is electrically connected with one of the control signal lines, a first end of the first transistor is electrically connected with the scanning signal input line, and a second end of the first transistor is electrically connected with the scanning line. A control end of the second transistor is electrically connected with one of the control signal lines, a first end of the second transistor is electrically connected with the fixed potential line, and a second end of the second transistor is electrically connected with the scanning line.

In some embodiments, the control end of the first transistor and the control end of the second transistor are electrically connected with a same one of the control signal lines. The first transistor is an N-type transistor, the second transistor is a P-type transistor. Or, the first transistor is a P-type transistor, the second transistor is an N-type transistor.

In some embodiments, the control end of the first transistor and the control end of the second transistor are electrically connected with different control signal lines.

In some embodiments, the display panel further includes: a gate drive circuit. The gate drive circuit includes a plurality of cascaded shifting registers, each of the shifting registers is electrically connected with the scanning signal input lines in one row of the control zones.

In some embodiments, each of the scanning lines includes a plurality of sub-scanning lines, the plurality of sub-scanning lines arranged in the first direction, and disconnected with each other. A quantity of the sub-scanning lines in each of the scanning lines is equal to a quantity of the control zones arranged in the first direction, and each of the sub-scanning lines corresponds to one row of sub-pixels in one of the control zones arranged in the first direction.

In some embodiments, the display panel is divided in to a display area and a periphery area surrounding the display area. The pixels islands are in the display area, and the scanning liens and the data lines extend from the display area to the periphery area. The display panel further includes, in the periphery area, a plurality of first data-selection control lines, a plurality of first data input lines, and a plurality of first data-selection circuits. Each of the first data-selection circuits includes at least two multiplexers. In each of the first data-selection circuits, input ends of different multiplexers are electrically connected with different first data input lines, control ends of different multiplexers are electrically connected with different first data-selection control lines, and i-th output ends of different multiplexers are electrically connected with a same one of the data lines, where i is an positive integer. In two adjacent first data-selection circuits, two multiplexers electrically connected with different data-selection control lines are electrically connected with a same one of the first data input lines, each of the first data-selection circuits is configured to supply signals of corresponding first data input lines respectively to the data lines electrically connected with the first data-selection circuits under a control of the plurality of first data-selection control lines.

In some embodiments, each sub-pixel row in each of the pixel islands includes h sub-pixels, each sub-pixel row is divided into a quantity a of sub-pixel groups, each sub-pixel group includes f sub-pixels, where a=h/f, a, h and f are positive integers greater than 1. The plurality of data lines connected with each sub-pixel group are electrically to a same one of the first data-selection circuits, and the plurality of data lines connected with different sub-pixel groups are electrically connected with different first data-selection circuits. Each of the multiplexers includes f output ends, one input end and f control ends.

In some embodiments, one of the first data-selection circuits includes j multiplexers. A quantity of the first data-selection control lines is j*f, a quantity of the first data-selection circuits are m, and a quantity of the first data input lines are n, where n=m+j−1. Here, j multiplexers electrically connected with different first data-selection control lines in each j continuous first data-selection circuits are electrically connected with one first data input line, where j is a positive integer less than m.

In some embodiments, one of the multiplexers includes f transistors. Control ends of different transistors are electrically connected with different first data-selection control lines, first ends of the different transistors are electrically connected with a same one of the first data input lines, and second ends of the different transistors are electrically connected with different data lines. In each of the first data-selection circuits, second ends of i-th transistors in different multiplexers are electrically connected with a same one of the data lines.

In some embodiments, one of the multiplexers includes f switch circuits. Each of the switch circuits includes a fifth transistor, a sixth transistor, a seventh transistor and a first capacitor. A control end of the fifth transistor is electrically connected with the first data-selection control line, a first end of the fifth transistor and a first end of the sixth transistor are electrically connected with the first data input line, a second end of the fifth transistor is electrically connected with a control end of the sixth transistor, a control end of the seventh transistor and a first end of the first capacitor, a second end of the sixth transistor and a second end of the seventh transistor are electrically connected with the data line, and a second end of the first capacitor is grounded. The display panel further includes: a dummy signal line electrically connected with a first end of the seventh transistor.

In some embodiments, each row of the sub-pixels arranged in the first direction are of the same color. The display panel further includes: a light-shielding layer, where the light-shielding layer merely includes a plurality of light-shielding parts extending in the first direction and arranged in the second direction.

Some embodiments of the present disclosure provide a display device. The display device includes: the display panel provided by some embodiments of the present disclosure; a cylindrical lens structure arranged on an light-emitting side of the display panel, where the cylindrical lens structure includes a plurality of cylindrical lenses arranged in array; and a controller connected with the display panel and configured to supply an independent drive signal to each of the control zones.

In some embodiments, each of the sub-pixel rows in each pixel island includes h sub-pixels, each pixel island corresponds to N cylindrical lenses, where h and N are positive integers, h>N, and h/N is a non-integer.

In some embodiments, each of the sub-pixel rows in each pixel island includes a light-shielding area, and a ratio of an area of the sub-pixels to an area of the light-shielding area is X, where X=N−1.

In some embodiments, the controller includes: a data parsing circuit configured to parse an image to be displayed and obtain a parsed image data; a data configuration circuit configured to generate a data drive signal corresponding to the control zones of the display panel according to a current display mode and the parsed image data; and a timing control circuit configured to generate a gate driving signal for a gate drive circuit according to the current display mode and a gaze zone, a non-gaze zone of the display panel.

In some embodiments, the display device further includes: an eye-tracking system configured to determine a gaze area for a user's eyes on the display device.

In some embodiments, the eye-tracking system includes: an image acquisition circuit including a plurality of first cameras and at least one second camera, where a resolution of each first camera is higher a resolution of the second camera, each first camera is configured to capture an image of the user's eye pupil, and the second camera is configured to capture an image of the user's face; a camera calibration circuit configured to calibrate the first cameras and the second camera and determine an internal parameter matrix and an external parameter matrix of the first cameras and the second camera; a camera time-division/zone-division control circuit configured to control a capture timing of the plurality of the first cameras in such a way that the plurality of the first cameras capture images in a cyclic alternating manner; a human face detection circuit configured to search a human-face frame in the image captured by the second camera, and detect a human-face feature point to determine a human-eye area in the human-face frame, and determine a space coordinates transform matrix of the human-eye area according to a mapping relationship between the human-face feature point and a human-face standard model; an image coordinates switch circuit configured to switch a human-face image coordinate system to a pupil image coordinate system, or switch a pupil image coordinate system to a human-face image coordinate system; a pupil detection circuit configured to calculate pupil coordinates in the image captured by the first camera, determine the human-eye area in an pupil image by transforming human-eye area coordinates obtained by the human-face detection circuit to pupil image coordinate system via the image coordinates switch circuit, and determine pupil coordinates in the pupil image coordinate system by detecting the pupil in the human-eye area in the pupil image; a space coordinates calculation circuit configured to transform the pupil coordinates to the human-face image coordinate system, and calculate pupil coordinates in 3D space via the space coordinate transform matrix obtained through the human-face detection circuit; and a spatial sight-tracking circuit configured to determine eyeball-center coordinates according to the pupil coordinates and a preset human-eye model, calculate a direction vector of the pupil coordinates and the eyeball-center coordinates as a line vector, determine a gaze point on the display panel according to a distance from a human eye to the display panel and an equation of a plane where the display panel is on, and determine coordinates of the gaze point on the display panel according to the gaze point.

In some embodiments, the display device further includes an image rendering system electrically connected with the controller. The image rendering system includes: a coordinate extraction circuit configured to determine 3D space coordinates of the human eye relative to the display panel according to a gaze position of a human-eye sight on the display panel of the display device determined by the eye-tracking system; a lens fitting detection circuit configured to obtain a fitting error of the cylindrical lenses, and adjust fitting detection parameters of the cylindrical lenses according to the fitting error, and obtain a viewpoint crosstalk curve; and an image rendering circuit configured to generate an initial image of multi-viewpoints according to an image to be displayed, and further configured to optimize the initial image of multi-viewpoints according to a human-eye position, the fitting detection parameters and the viewpoint crosstalk curve to obtain optimized image of multi-viewpoints as the image to be displayed.

Some embodiments of the present disclosure provide a driving method for the display device. The driving method includes: determining a gaze zone and a non-gaze zone for a user on the display device in real time; driving control zones corresponding to the gaze zone independently to perform image display with a first resolution, and driving control zones corresponding to the non-gaze zone to perform image display with a second resolution, where the first resolution is greater than the second resolution.

In some embodiments, the determining a gaze zone and a non-gaze zone for a user on the display device, includes: determining the gaze zone for the user eyes on the display device through the eye-tracking system; determining a zone except the gaze zone on the display device as the non-gaze zone.

In some embodiments, the determining the gaze zone of the user eyes on the display device through the eye-tracking system, includes: controlling first cameras in the eye-tracking system to capture an image of the user's pupil in a cyclic alternating manner, and controlling a second camera in the eye-tracking system to capture an image of the user's face; searching a human-face frame in the image captured by the second camera, and detecting a human-face feature point to determine a human-eye area in the human-face frame, and determine a space coordinate transform matrix of the human-eye area according to a mapping relationship between the human-face feature point and the human-face standard model; switching a human-face image coordinate system into a pupil image coordinate system, or switching a pupil image coordinate system into a human-face image coordinate system; calculating pupil coordinates in the image captured by the first camera, transforming coordinates of the human-eye area into the pupil image coordinate system to determine a human-eye area in the pupil image, and performing a pupil detection in the human-eye area in the pupil image to determine pupil coordinates in the pupil image coordinate system; transforming the pupil coordinates into the human-face image coordinate system, calculating pupil coordinates in 3D space according to the space coordinate transform matrix; determining eyeball center coordinates according to the pupil coordinates and a preset eyeball model; calculating a direction vector of the pupil coordinates and the eyeball center coordinates as a line vector; determining a gaze point on the display panel according to a distance from the user's eyes to the display panel and an equation of plane where the display panel is; and determining coordinates of the gaze point on the display panel according to the gaze point, and determining a zone where the coordinates of the gaze point is on the display panel as the gaze zone.

In some embodiments, the driving control zones corresponding to the gaze zone independently to perform image display with a first resolution, driving control zones corresponding to the non-gaze zone to perform image display with a second resolution, includes: determining display information of each sub-pixel in the pixel islands of the control zones corresponding to the gaze zone, according to the display mode, the gaze zone and the non-gaze zone; supplying the first data-selection control signal to the first data-selection control line according to the display information, and supplying data signals supplied by the first data input lines to the data lines corresponding to the first data-selection circuit through the first data-selection circuit.

In some embodiments, the driving control zones corresponding to the gaze zone independently to perform image display with a first resolution, driving control zones corresponding to the non-gaze zone to perform image display with a second resolution, further includes: supplying a gate drive signal to a gate drive circuit of the display panel through the controller of the display device, to scan multiple rows of pixel islands corresponding to the gaze zone row-by-row, and scan F rows of multiple rows of pixel islands corresponding to the non-gaze zone simultaneously, wherein F is a positive integer, and F is equal to a ratio of the first resolution to the second resolution.

In some embodiments, the gate drive circuit in the display panel includes a plurality of gate drive groups, each of the plurality of gate drive groups includes B gate drive subgroups, and each of the gate drive sub-groups includes C shifting registers, where B and C are integers greater than 1. The supplying a gate drive signal to the gate drive circuit of the display panel through the controller of the display device, includes: supplying a clock control signal to the gate drive groups through the controller, so as to input an initiating signal into the shifting registers in the gate drive sub-groups in sequence according to an order from a first to a B-th gate drive sub-groups in each gate drive group.

In some embodiments, the method further includes: driving the gaze zone to perform image display with a first refresh rate, and driving the non-gaze zone to perform image display with a second refresh rate, wherein the first refresh rate is greater than the second refresh rate.

In some embodiments, the driving the gaze zone to perform image display with a first refresh rate, and driving the non-gaze zone to perform image display with a second refresh rate, includes: driving each sub-pixel in the gaze zone to be refreshed by Z times; and driving each sub-pixel in the non-gaze zone to be refreshed by Y times. Here, Z and Y are positive integer, and Z is greater than Y.

In some embodiments, the driving each sub-pixel in the gaze zone to be refreshed, includes: driving each of the scanning signal input lines corresponding to the gaze zone to transmit an active level signal in sequence; controlling each of the control signal lines to transmit a control signal, transmitting a signal from the scanning signal line to a scanning line corresponding to the gaze zone, transmitting a signal from the fixed potential line to a scanning line corresponding to the non-gaze zone. The driving each sub-pixel in the non-gaze zone to be refreshed, includes: driving each of the scanning signal input lines in the display panel to transmit an active level signal in sequence; while each sub-pixel row corresponding to the gaze zone being scanned, controlling each of the control signal lines to transmit a control signal, transmitting the signal from the fixed potential line to the scanning line corresponding to the gaze zone, transmitting the signal from the scanning signal input line to the scanning line corresponding to the non-gaze zone.

Some embodiments of the present disclosure provide an image rendering method for the display device. The image rendering method includes: determining a gaze position for a human-eye on the display panel of the display device, and determining 3D space coordinates of the human-eye relative to the display panel; generating an initial image of multi-viewpoints according to an image to be displayed; performing a fitting detection for a cylindrical lenses array on the display device, and determining a fitting error of the cylindrical lenses and a viewpoint crosstalk curve; optimizing the initial image of multi-viewpoints according to a human-eye position, a fitting detection parameter and the viewpoint crosstalk curve, determining an optimized image of multi-viewpoints; transmitting the optimized image of multi-viewpoints to the controller.

BRIEF DESCRIPTION OF FIGURES

In order to illustrate the technical solutions in embodiments of the present application more clearly, the accompanying drawings which need to be used in the embodiments of the present application will be introduced below briefly. Obviously the accompanying drawings introduced below are only some embodiments of the present application, and other accompanying drawings can also be obtained by those ordinary skilled in the art according to these accompanying drawings without creative labor.

FIG. 30 is a schematic structural diagram of a gate drive circuit according to an embodiment of the present disclosure.

FIG. 33 is a schematic flow diagram of an image rendering method for a display device according to an embodiment of the present disclosure.

DETAILED DESCRIPTION

Figure 1:
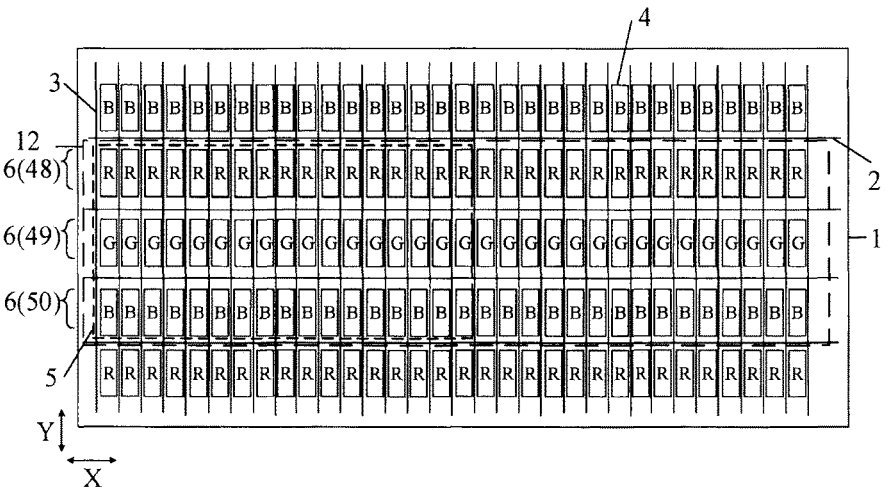
FIG. 1 is a schematic structural diagram of a display panel according to an embodiment of the present disclosure.

To make objectives, technical solutions and advantages of embodiments of the present disclosure clearer, the technical solutions of the embodiments of the present disclosure will be clearly and completely described below in conjunction with accompanying drawings of the embodiments of the present disclosure. Apparently, the described embodiments are only a part of the embodiments of the present disclosure, not all of the embodiments. The embodiments in the present disclosure and features in the embodiments can be combined with each other in the case of not conflicting. Based on the described embodiments of the present disclosure, all other embodiments obtained by those ordinarily skilled in the art without creative work shall fall within the protection scope of the present disclosure.

Unless otherwise indicated, technical or scientific terms used in the present disclosure shall have the ordinary meanings understood by those ordinarily skilled in the art to which the present disclosure pertains. The words "first", "second" and similar words used in the present disclosure do not indicate any order, quantity or importance, but are merely used to distinguish different components. The words "comprise" or "include", and the like indicate that an element or item appearing before such word covers listed elements or items appearing after the word and equivalents thereof, and does not exclude other elements or items. The words "connect" or "couple" or the like are not limited to physical or mechanical connection, but may include electrical connection, whether direct or indirect.

It needs to be noted that sizes and shapes of all figures in the accompanying drawings do not reflect true scales, and are only intended to schematically illustrate the content of the present disclosure. The same or similar reference numerals represent the same or similar elements or elements with the same or similar functions all the time.

Embodiments of the present disclosure provide a display panel. As shown in FIG. 1, the display panel includes:

a first base substrate 1;

a plurality of scanning lines 2 on a side of the first base substrate 1; the scanning lines 2 extending in a first direction X, and arranging in a second direction Y, the first direction X intersecting with the second direction Y;

a plurality of data lines 3 on a side same as the side where the scanning lines 2 are, of the first base substrate 1; the data lines 3 extending in the second direction Y and arranging in the first direction X;

a plurality of sub-pixels 4 respectively within zones divided by the scanning lines 2 and the data lines 3; the sub-pixels 4 constituting a plurality of pixel islands 5; the pixel islands 5 being divided into a plurality of control zones 14; each of the control zones 14 including at least one pixel island 5; each of the control zone 14 being independently driven to emit light.

In the display panel provided by embodiments of the present disclosure, the pixel islands are divided into a plurality of control zones and each control zone can be independently driven to emit light, so that the resolutions and refresh rate of the display panel can be controlled in zones according to display images. When the resolutions of the display panel are controlled in zones, the display panel can be divided into a high-definition zone, and a low-definition zone. The resolutions of the high-definition zone are greater than the resolutions of the low-definition zone. For an example, the resolutions of zone being watched by eyes can be increased to improve the display effect. When the refresh rate of the display panel is controlled in zones, the display panel can be divided into a high-refresh zone and a low-refresh zone, so as to save the power consumption of display products.

It should be noted that, FIG. 1 merely illustrates a part of sub-pixels of the display panels. The first direction X is perpendicular to the second direction Y in FIG. 1.

In some embodiments, as shown in FIG. 1, each of the pixel islands 5 includes a plurality of sub-pixel rows 6 in the second direction Y.

As shown in FIG. 1, each of the pixel islands 5 includes three sub-pixel rows 6, i.e., a first sub-pixel row 48, a second sub-pixel row 49 and a third sub-pixel row 50.

The first sub-pixel row 48 includes a plurality of first color sub-pixels arranged in the first direction X.

The second sub-pixel row 49 includes a plurality of second color sub-pixels arranged in the first direction X.

The third sub-pixel row 50 includes a plurality of third color sub-pixels arranged in the third direction X.

In some embodiments, as shown in FIG. 1, the first color sub-pixels are red pixels R, the second sub-pixels are green pixels G, and the third sub-pixels are blue sub-pixels B.

In some embodiments, as shown in FIG. 1, one row of sub-pixels 4 arranged in the first direction X are of the same color.

Figure 2:
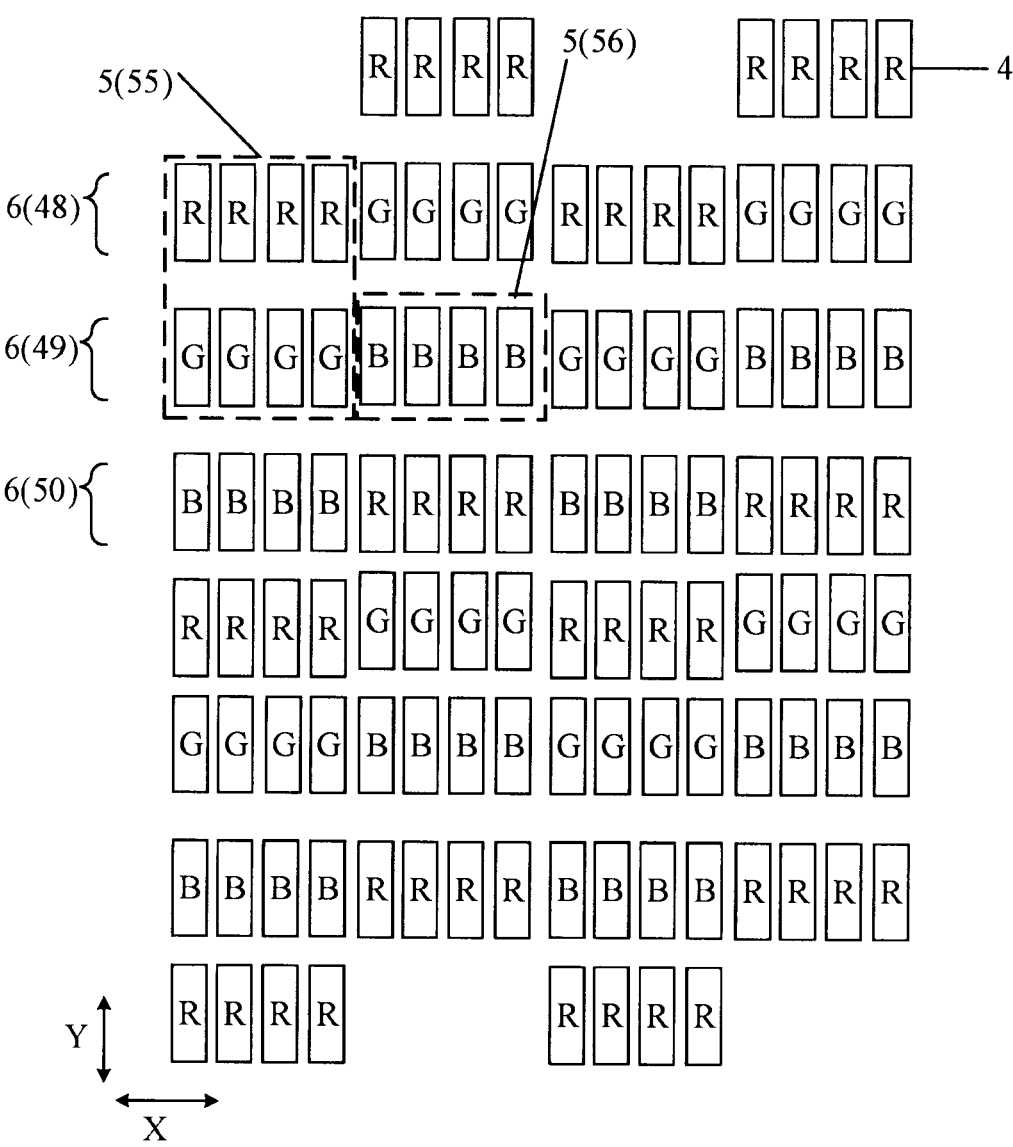
FIG. 2 is another schematic structural diagram of a display panel according to an embodiment of the present disclosure.

Alternatively, in some embodiments, as shown in FIG. 2, one row of sub-pixels 4 arranged in the first direction X are of different colors. For an example, the first sub-pixel row 48, the second sub-pixel row 49 and the third sub-pixel row 50 serve as a repeated unit and arranged in a column in the second direction Y. An odd numbered column is offset in relation to an even numbered column. The pixel island 5 includes a first pixel island 55 and a second pixel island 56. The first pixel island 55 includes the first sub-pixel row 48 and the second sub-pixel row 49. The second pixel island 56 includes the third sub-pixel row 50. When the display panel is driven to display, a sub-pixel rendering technique is used in such a way that the first island 55 and the second sub-pixel island 56 adjacent thereto constitute one pixel for display, to thereby improve the resolutions of the display panel.

In some embodiments, the display panel may be a rigid display panel or a flexible display panel which is bendable and foldable.

In some embodiments, the display panel may be a liquid crystal display panel, such as Twisted Nematic (TN) LCD, Vertical Alignment (VA) LCD, In-Plane Switching (IPS) LCD, or AdvancedSuper Dimension Switch (ADS) LCD.

In some embodiments, the liquid crystal display panel includes an array substrate and an opposite substrate which are opposite to each other, and a liquid crystal layer arranged between the array substrate and the opposite substrate.

In some embodiments, the scanning lines and the data lines may be disposed on the array substrate.

In some embodiments, as shown in FIG. 3 to FIG. 6, the opposite substrate includes a black matrix 7 and a color film 8.

Figures 3, 4:
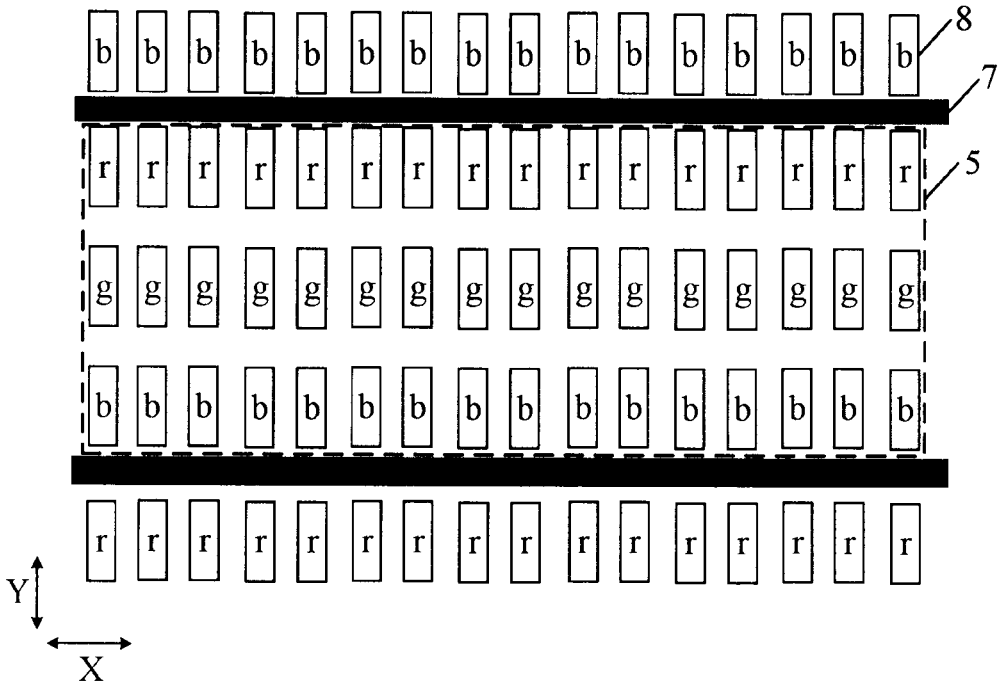
FIG. 3 is another schematic structural diagram of a display panel according to an embodiment of the present disclosure.
FIG. 4 is another schematic structural diagram of a display panel according to an embodiment of the present disclosure.

In some embodiments, as shown in FIG. 3, the black matrix 7 is arranged between adjacent pixel islands in the second direction Y.

In some embodiments, as shown in FIG. 4, the black matrix 7 is arranged between adjacent pixel islands in the second direction Y and between adjacent sub-pixel columns.

Figures 5, 6:
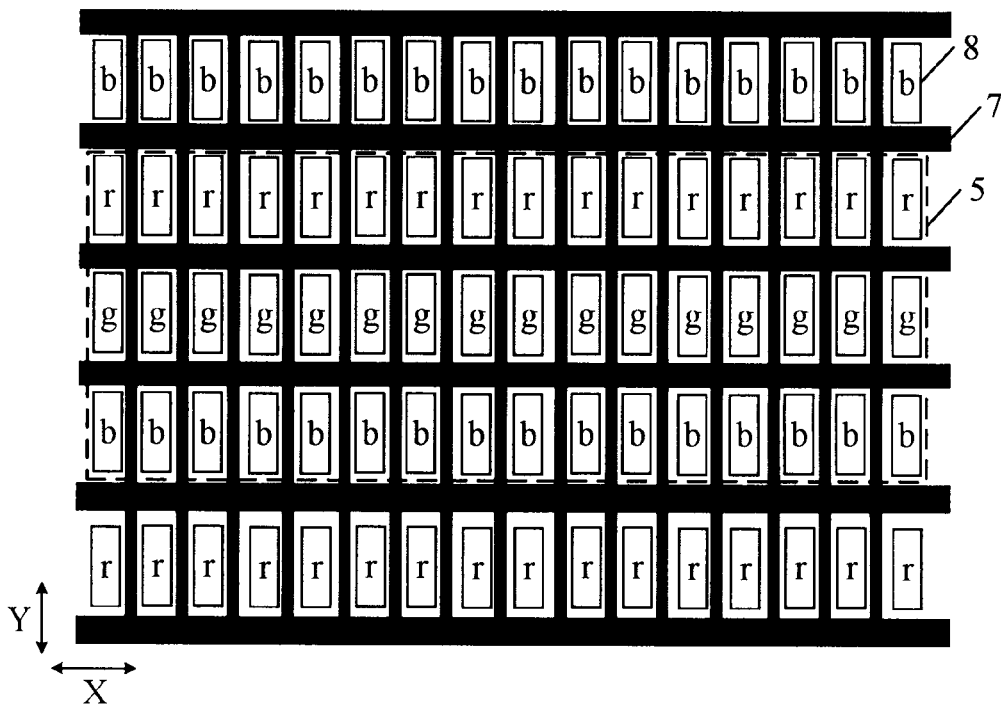
FIG. 5 is another schematic structural diagram of a display panel according to an embodiment of the present disclosure.
FIG. 6 is another schematic structural diagram of a display panel according to an embodiment of the present disclosure.

In some embodiments, or as shown in FIG. 5, the black matrix 7 is arranged between adjacent sub-pixel rows and between adjacent sub-pixel columns.

In some embodiments, when a row of sub-pixels arranged in the first direction X are of the same color, as shown in FIG. 6, the black matrix 7 is only arranged between adjacent sub-pixel rows.

There is no crosstalk between sub-pixels of adjacent sub-pixel rows, even if there is no the black matrix between the sub-pixel columns, because each row of sub-pixels arranged in the first direction X are of the same color. The aperture ratio can be improved by merely arranging the black matrix between adjacent rows of sub-pixels.

In some embodiments, the display panel is an electro-luminescent display panel. For examples, the electro-luminescent display panel may be an Organic Light Emitting Diodes (OLED) display panel, a Quantum Dot Light Emitting diodes (QLED) display panel and etc. In some embodiments, each sub-pixel, for an example, includes a pixel driving circuit and an electro-luminescent device electrically connected with the pixel driving circuit. The pixel driving circuit, for an example, includes a transistor, a capacitor and etc.

Figure 7:
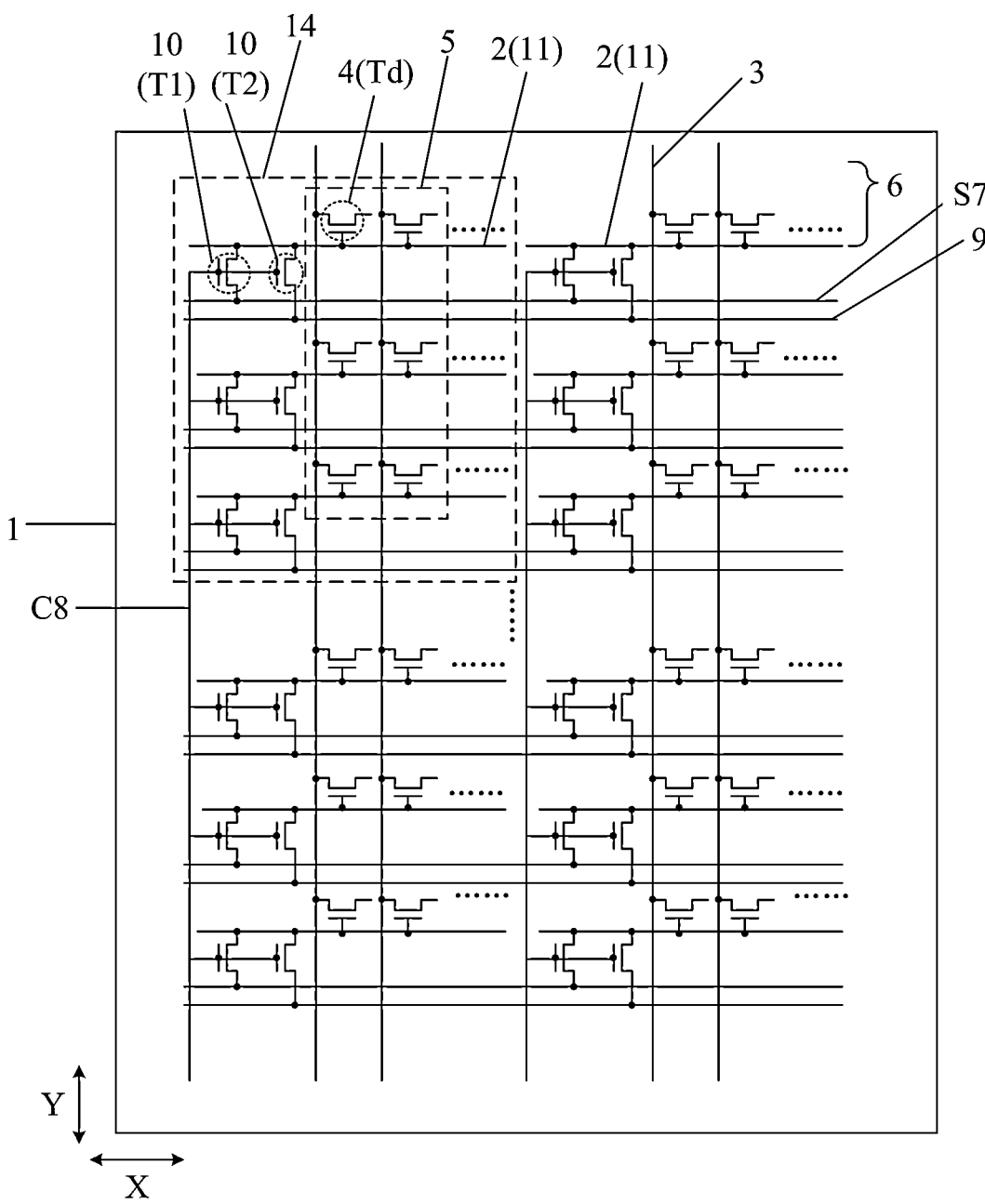
FIG. 7 is another schematic structural diagram of a display panel according to an embodiment of the present disclosure.
Figure 8:
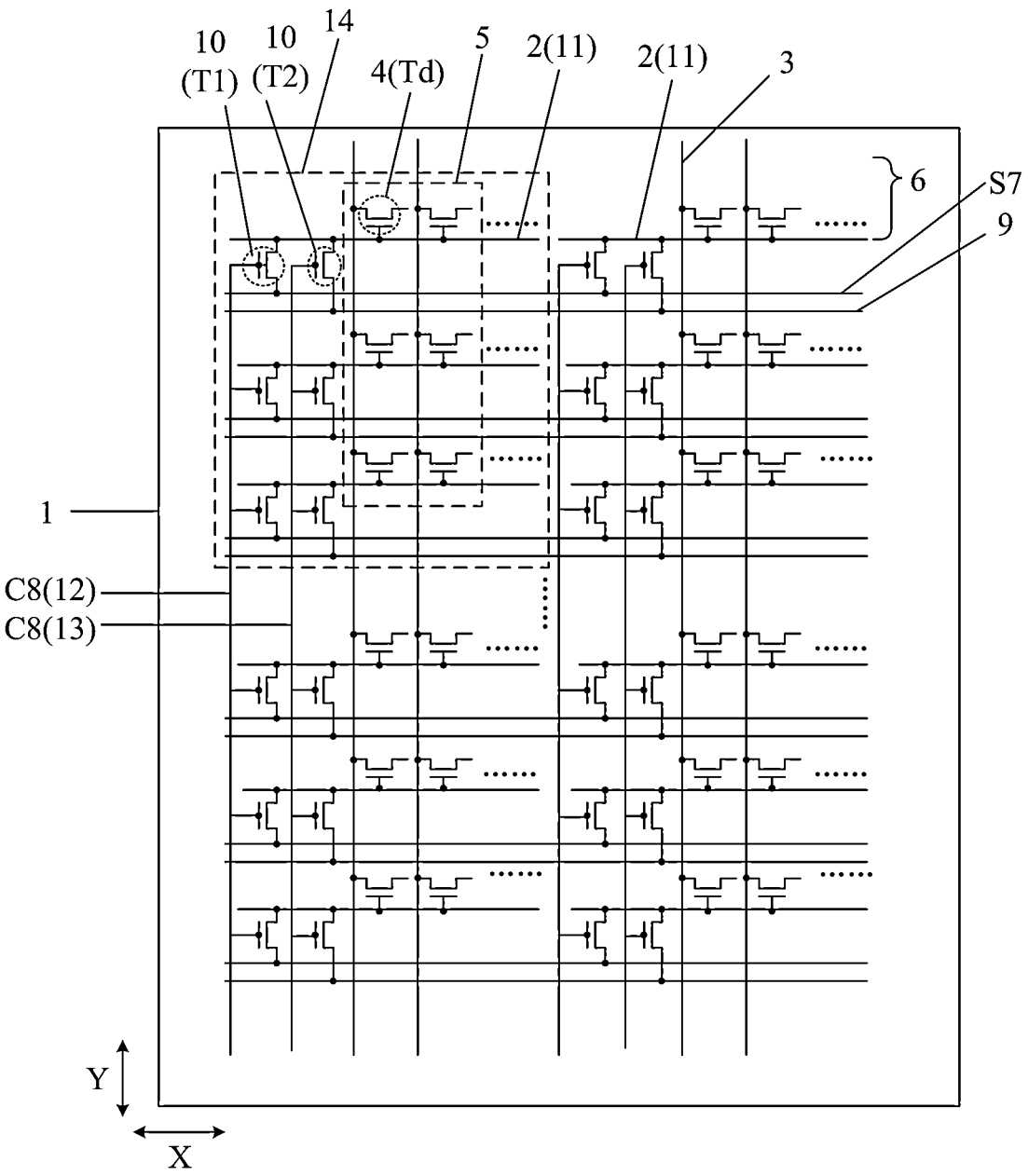
FIG. 8 is another schematic structural diagram of a display panel according to an embodiment of the present disclosure.
Figure 10:
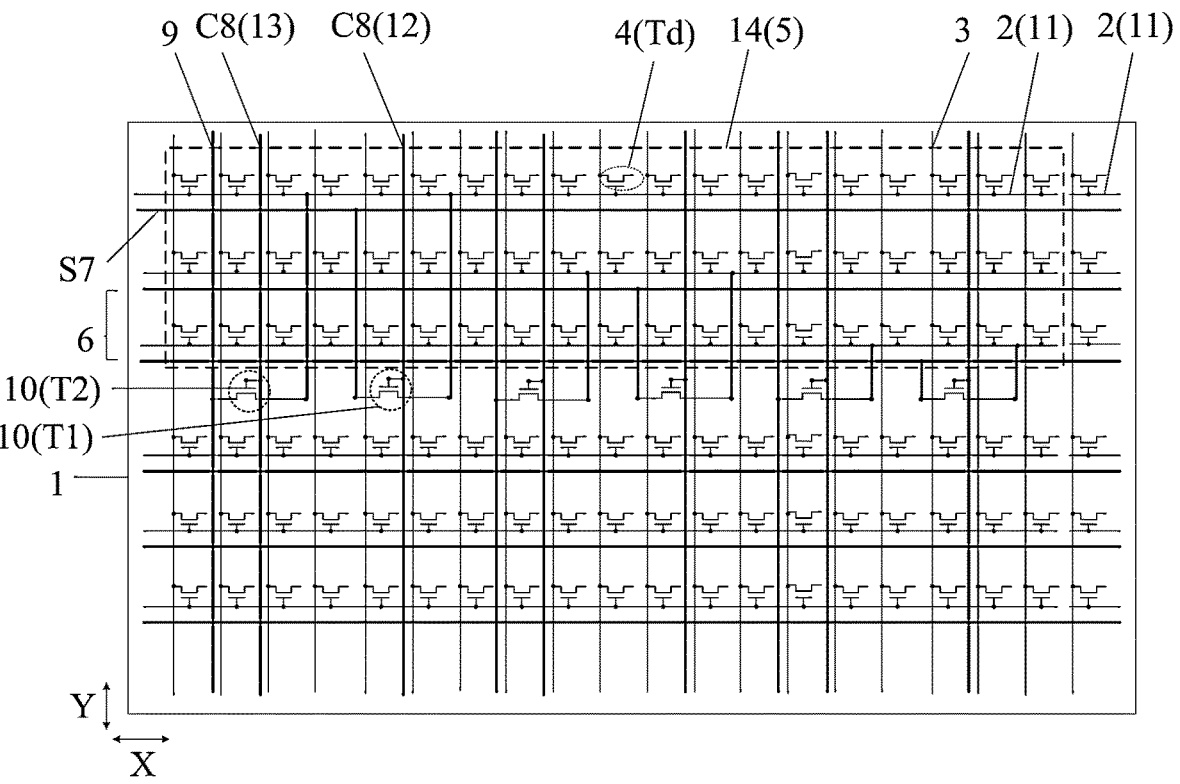
FIG. 10 is another schematic structural diagram of a display panel according to an embodiment of the present disclosure.

In some embodiments, as shown in FIG. 7, FIG. 8 and FIG. 10, the display panel further includes:

a plurality of scanning signal input lines S7 corresponding to the scanning lines 2 in an one-to-one manner, the scanning signal input lines S7 extending in the first direction X and arranged in the second direction Y;

a plurality of control signal lines C8 arranged in the first direction X;

a plurality of fixed potential lines 9;

a plurality of control circuits 10 arranged between adjacent sub-pixels 4; one pixel island 5 being connected with at least n control circuits 10; one of the n control circuits 10 corresponding to one of sub-pixel rows 6;

where, the control circuit is configured to transmit a signal supplied by the scanning signal input line S7 or a signal supplied by the fixed potential line 9 to the scanning line 2 under the control of the control signal line C8.

The display panel provided by some embodiments of the present disclosure includes the control circuits and the control signal lines, the fixed potential lines, the scanning signal input lines which are connected with the control circuits, so that the signal supplied by the scanning signal input lines or the signal supplied by the fixed potential lines can be transmitted to the scanning lines. That is, during an image display process, for zones which need to be refreshed, normal scanning signals can be input into corresponding scanning lines via the control circuits; for zones which do not need to be refreshed, fixed potential signals provided by the fixed potential lines can be input into corresponding scanning lines via the control circuits. As such, the pixel islands can be driven by zones so as to save the power consumption of display products. Moreover, the pixel islands are arranged in array and each of the pixel islands is electrically connected with the control circuit, so that each of the pixel islands of the display panel can be controlled by zones in the second direction.

In some embodiments, when the display panel is an LCD display panel, as shown in FIG. 7, FIG. 8 and FIG. 10, the sub-pixel 4 includes a drive transistor Td and a pixel electrode (not shown in figures) electrically connected with the drive transistor Td. A control end of the drive transistor Td is electrically connected with a scanning line 2. The first end of the drive transistor Td is electrically connected with a data line 3. The second end of the drive transistor Td is electrically connected with the pixel electrode.

In some embodiments, the LCD display panel further includes a common electrode layer disposed on the array substrate or disposed on the opposite substrate.

In some embodiments, the fixed potential line provides a low level signal.

In some embodiments, as shown in FIG. 7, FIG. 8 and FIG. 10, each of the scanning lines 2 includes a plurality of sub-scanning lines 11 arranged in the first direction X and disconnected from each other. Within each of the scanning lines 2, the number of the sub-scanning lines 11 is equal to the number of control zones 14 in one row arranged in the first direction X, and each of the sub-scanning lines 11 corresponds to a row of sub-pixels 4 in one control zone 14.

In this case, the scanning line is broken between the control zones, so that each of the control zones can be controlled independently via the control circuits.

In some embodiments, as shown in FIG. 7, FIG. 8 and FIG. 10, one pixel island is connected with n corresponding control circuits.

In some embodiments, as shown in FIG. 7, FIG. 8 and FIG. 10, in each control zone 14, one row of pixel islands 5 arranged in the first direction X are connected with n corresponding control circuits 10.

In some embodiments, each of the pixel islands may be connected with n control circuit.

In some embodiments, as shown in FIG. 7, FIG. 8 and FIG. 10, each of the pixel islands 5 includes three sub-pixel rows 6, i.e., n=3, each of the pixel islands 5 is connected with three corresponding circuits 10.

In some embodiments, as shown in FIG. 7, FIG. 8, FIG. 9 and FIG. 10, the control circuit 10 includes: a first transistor T1 and a second transistor T2.

A control end of the first transistor T1 is electrically connected with one control signal line C8. The first end of the first transistor T1 is electrically connected with a scanning signal input line S7. The second end of the first transistor T1 is electrically connected with a scanning line 2.

A control end of the second transistor T2 is electrically connected with one control signal line C8. The first end of the second transistor T2 is electrically connected with a fixed potential line 9. The second end of the second transistor T2 is electrically connected with a fixed potential line 9.

In some embodiments, for a plurality of the control circuits corresponding to one control zone, when the first transistor is turned on and the second transistor is turned off under the control of a control signal provided by the control signal line, a signal provided by the scanning signal line is transmitted to the scanning line through the first transistor, so as to refresh the pixel islands in the control zone. When the second transistor is turned on, and the first transistor is turned off under the control of a control signal provided by the control signal line, a low level signal provided by the fixed potential line is transmitted to the scanning line through the second transistor, so as to not refresh the pixel islands in the control zone.

In some embodiments, in one control circuit, the second end of the first transistor T1 and the second end of the send are electrically connected with a same sub-scanning line.

In some embodiments, as shown in FIG. 7, the control end of the first transistor T1 and the control end of the second transistor T2 are electrically connected with a same control signal line C8.

The first transistor is an N-type transistor, and the second transistor is a P-type transistor. Alternatively, the first transistor is a P-type transistor, and the second transistor is an N-type transistor.

Figure 9:
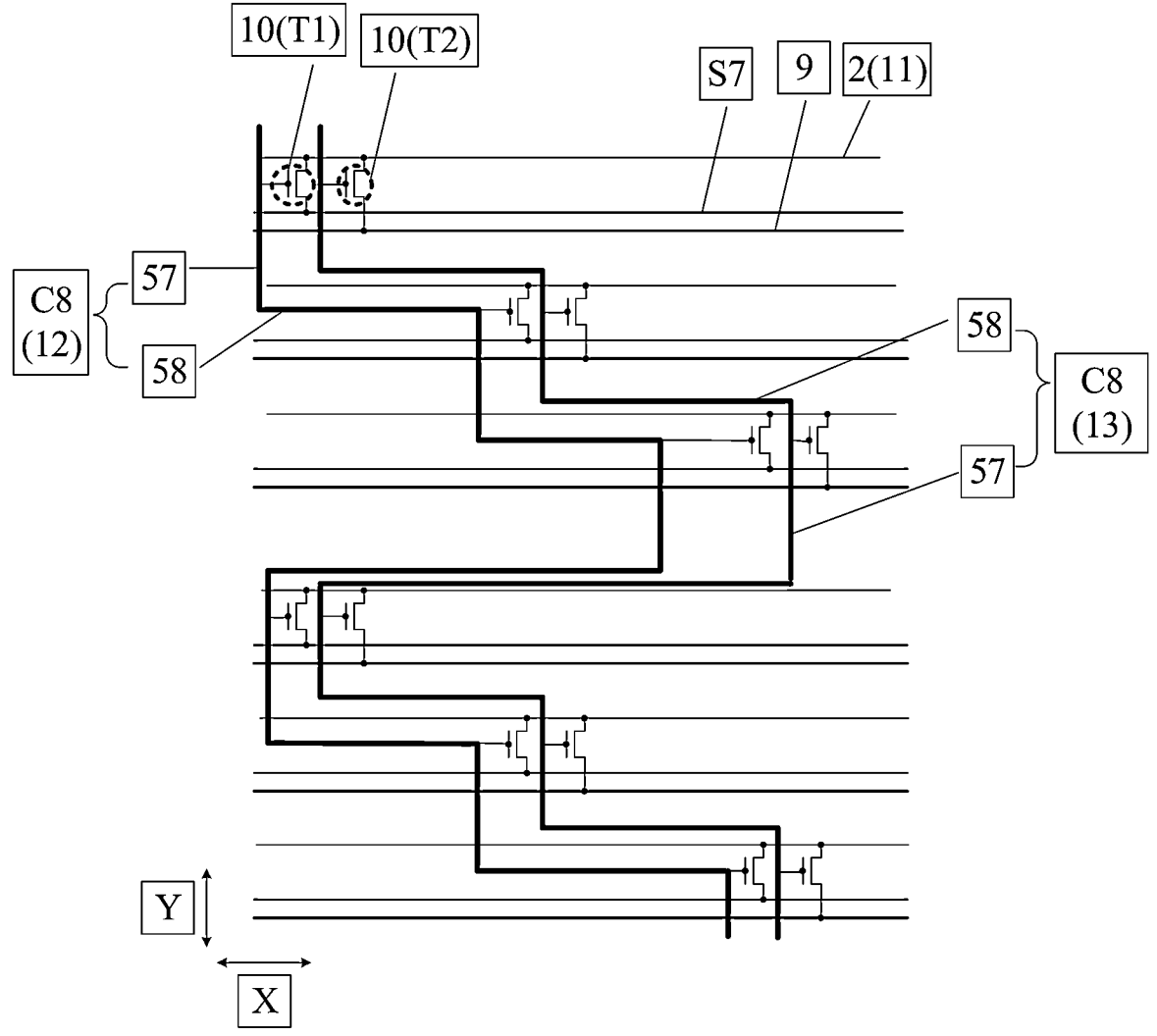
FIG. 9 is another schematic structural diagram of a display panel according to an embodiment of the present disclosure.

In some embodiments, as shown in FIG. 8, FIG. 9 and FIG. 10, the control end of the first transistor T1 and the control end of the second transistor T2 are electrically connected with different control signal lines C8.

In some embodiments, as shown in FIG. 8, FIG. 9 and FIG. 10, the control signal lines C8 include a plurality of first control signal lines 12 and a plurality of second control signal lines 13.

The control end of the first transistor T1 is electrically connected with a first control signal line 12. The control end of the second transistor T2 is electrically connected with a second control signal line 13.

In some embodiments, when the control end of the first transistor and the control end of the second transistor are electrically connected with different control signal lines, the first transistor may an N-type transistor or a P-type transistor; the second transistor may be an N-type-transistor or a P-type transistor.

In some embodiments, as shown in FIG. 7 and FIG. 8, the control circuit 10 is arranged between two adjacent sub-pixels 4 in the first direction X.

A plurality of fixed potential lines 9 extends in the first direction X, and is arranged in the second direction Y.

In other words, each control circuit 10 is arranged between two adjacent sub-pixel columns 4, as shown in FIG. 7 and FIG. 8.

In some embodiments, as shown in FIG. 7 and FIG. 8, each of the control signal lines C8 extends in the second direction Y. The plurality of control circuits 10 are arranged in array. Control circuits corresponding to one pixel island are arranged in the same column.

Alternatively, in some embodiments, when the control circuit is disposed between two adjacent columns of sub-pixels, as shown in FIG. 9, at least a part of control signal lines C8 include a plurality of portions 57 extending in the second direction Y, and a plurality of second portions 58 extending in the first direction X. The portions 57 extending in the second direction and the portions 58 extending in the first direction are in connection and in an alternating arrangement.

In the display panel provided by embodiments of the present disclosure, the control signal line includes portions extending in the first direction and portions extending in the second direction, so that the control signal line extends in the second direction Y in an irregular way. When a plurality of control signal lines are arranged in the first direction, the mura effect due to regular arrangement of signal lines in vertical direction can be avoided.

In some embodiments, as shown in FIG. 9, the control circuits corresponding to each pixel island are arranged in several columns in the second direction Y, that is, the control circuits are arranged dispersedly, so as to further avoid the mura effect.

Alternatively, in some embodiments, as shown in FIG. 10, the control circuit 10 is arranged between two adjacent sub-pixels 4 in the second direction Y.

A plurality of fixed potential lines 9 extend in the second direction Y, and are arranged in the first direction X.

The control circuits 10 are arranged between adjacent sub-pixel rows.

In some embodiments, the control circuits corresponding to each pixel island are arranged in one row in the first direction X.

In some embodiments, the control circuits corresponding to each pixel island are arranged in multiple rows in the first direction X.

In some embodiments, the display panel further includes a gate drive circuit.

The gate drive circuit includes a plurality of shift register GOA in cascade. One of the shift registers GOA is electrically connected with the respective scanning signal input lines in one row of control zone. The gate drive circuit is electrically connected with a clock signal line CLK and a start signal line STV.

Accordingly, the zone control can be performed on multiple rows of pixel islands by means of the gate drive circuit, that is, the horizontal zone control is achieved. In other words, the zone control can be performed on pixel islands of the display device in both the first direction and the second direction. In some embodiments, by providing corresponding time sequence to the gate drive circuit, the pixel islands in a display area can be scanned row-by-row by means of the gate drive circuit, and the pixel islands in the display area can also be scanned simultaneously by means of the gate drive circuit.

In some embodiments, the gate drive circuits in the display panel include a plurality of gate drive groups. Each of the gate drive groups includes B gate drive sub-groups. Each of the gate drive sub-groups includes C shift registers. Here, B and C are integers greater than 1. The start signal line STV is electrically connected with C shift registers in the first gate drive sub-group.

Figure 11:
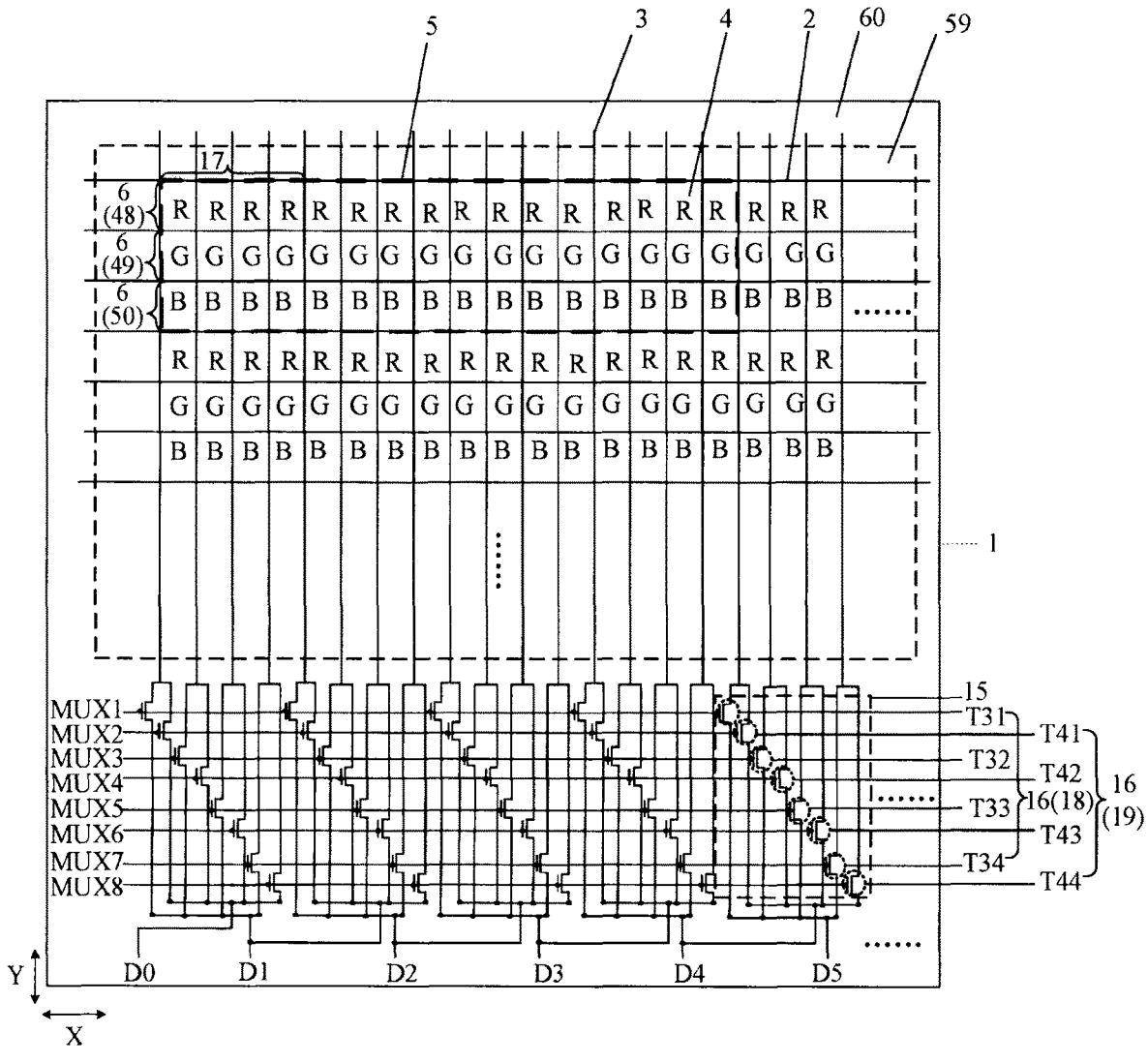
FIG. 11 is another schematic structural diagram of a display panel according to an embodiment of the present disclosure.

In some embodiments, as shown in FIG. 11, the display panel is divided into a display area 59 and a periphery area 60 surrounding the display area 59. The pixel islands are in the display area 59. The scanning lines 2 and the data lines 4 extend from the display area 59 to the periphery area 60.

In some embodiments, the gate drive circuit can be, for an example, arranged in the periphery area.

Figure 12:
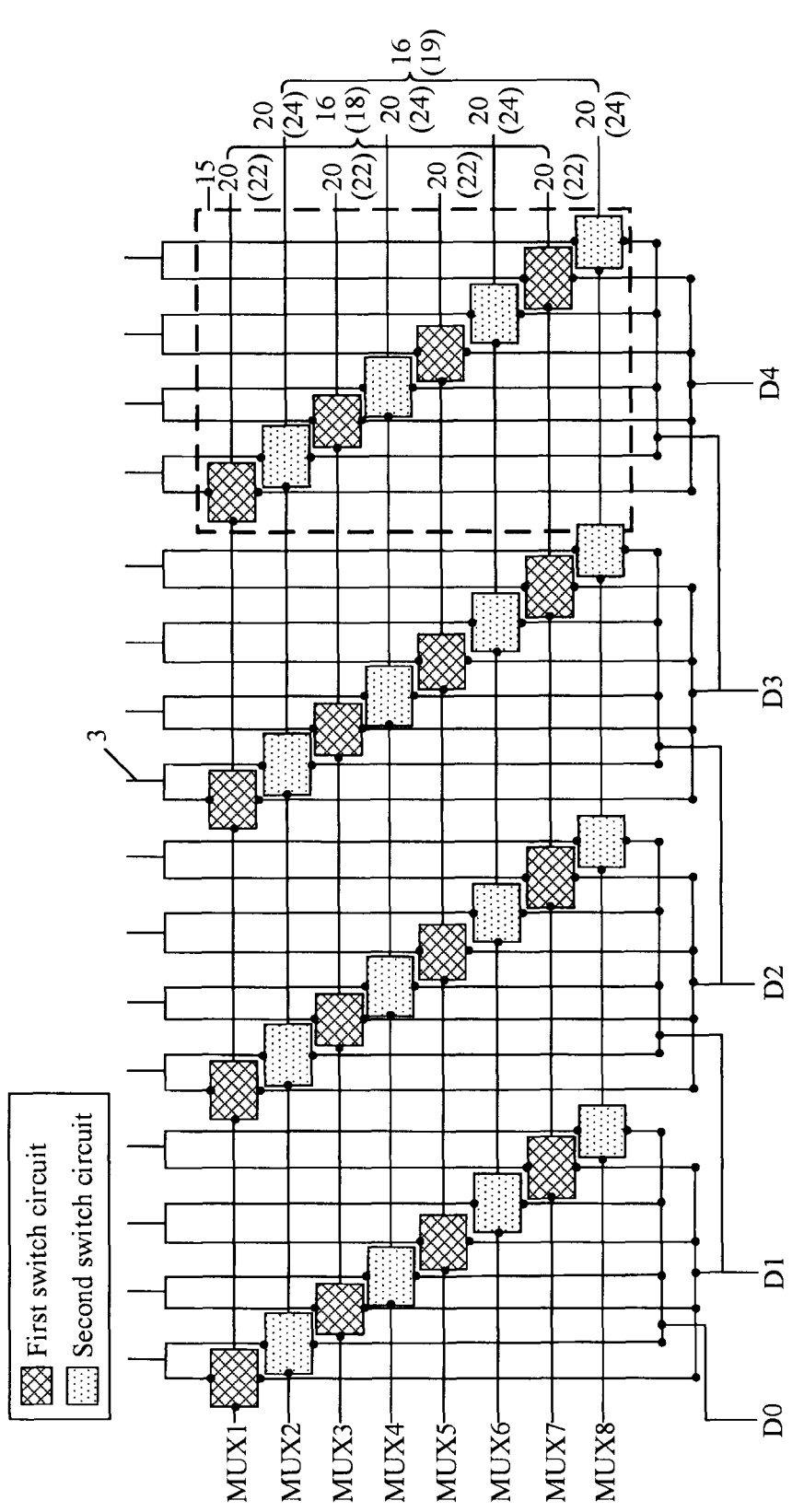
FIG. 12 is yet another schematic structural diagram of a display panel according to an embodiment of the present disclosure.

In some embodiments, as shown in FIG. 11, and FIG. 12, the display panel further includes: a plurality of first data-selection control lines MUX, a plurality of first data input lines D and a plurality of first data-selection circuit 15 in the periphery area 60.

Each of the first data-selection circuit 15 includes at least two multiplexers 16. In each of the first data-selection circuit 15, input ends of different multiplexers 16 are electrically connected with different first data input lines D; control ends of different multiplexers 16 are electrically connected with different first data-selection control lines MUX; the i-th output ends of different multiplexers 16 are electrically connected with the same data line 3. Here, i is a positive integer. Within two adjacent first data-selection circuits 15, two multiplexers 16 electrically connected with different first data-selection control lines MUX are electrically connected with the same first data input line D. The first data-selection circuit 15 is configured to provide signals from corresponding first data input lines D to data lines 3 electrically connected with the first-data selection circuit 15 under control of the signals of multiple first data-selection control lines MUX.

The display panel provided by embodiments of the present disclosure provides signal from the first data input lines to the data lines through the first data-selection circuits, so that the number of the first data input lines is less than the number of the data lines, thus the data input amount can be reduced.

In the display panel provided by embodiments of the present disclosure, each of the first data-selection circuits includes at least two multiplexers. The different multiplexers in each of the first data-selection circuits are electrically connected with different first data input lines. For a first data-selection circuit, under the control of signals from multiple first data-selection control lines, it can provide a signal from a same one first data input line to each data line connected with the first data-selection circuit, and it can also provide signals from different first data input lines to corresponding data lines through different multiplexers. The multiple data lines connected with the same one first data-selection circuit can be provided with the same data signals, or data signals which are not totally the same. In this way, sub-pixels in each pixel island can display individually, or a row of sub-pixels can display in combination, so that the resolutions of the display panel is adjustable. Moreover, when multiple sub-pixels in the same row of each pixel island are required to display in combination, and the sub-pixels for display in combination are changed along with a change of a gaze position, the first data-selection circuits of the display panel provided by embodiments of the present disclosure allow display information of the sub-pixels for display in combination to be changed adaptively. That is, the display information of the sub-pixels can have a smooth transition along with the movement of human eyes, so as to improve the display effect and promote user experiences.

It should be noted that, the display area is not shown in FIG. 12, and merely a part of data lines, scanning lines, sub-pixels, the first data input lines and the first data-selection circuits are shown in FIG. 11 and FIG. 12.

In some embodiments, as shown in FIG. 11, each of the pixel islands 5 includes a plurality of sub-pixel rows 6 arranged in the first direction X. Each of the sub-pixel rows 6 includes h sub-pixels 4 arranged in the second direction Y. Each of the sub-pixel rows 6 is divided into a quantity a of sub-pixel groups 17. Each of the sub-pixel groups 17 includes f sub-pixels 4, here, a=h/f, and a, h, f are positive integers greater than 1.

In one sub-pixel row 6, each sub-pixel group 17 is electrically connected with one first data-selection circuit 15 through data lines 3. Different sub-pixel groups 17 are electrically connected with different first data-selection circuits 15 through data lines 3.

Each of the multiplexers 16 includes f output ends, one input end and f control ends.

In this way, for each sub-pixel group in one sub-pixel row, under the control of signals from multiple first date-selection control lines, signals from the same first data input line can be provided to each data line electrically connected with the sub-pixel group through a corresponding first data-selection circuit, and signals from different first data input lines can be provided to each data line electrically connected with the sub-pixel group through the corresponding first data-selection circuit. That is, each sub-pixel in one sub-pixel group can be input with the same display information through the first data-selection circuit, or can be input with display information which is not totally the same through the first data-selection circuit.

It should be noted that, in some embodiments, the sub-pixels are electrically connected with both the scanning lines and the data lines. A column of sub-pixels arranged in the first direction X are electrically connected with the same data line; and a row of sub-pixels arranged in the second direction Y are electrically connected with the same scanning line. In some embodiments, one first data-selection circuit is electrically connected with a column of sub-pixel groups through f data lines.

In some embodiments, the number of the first data-selection circuits is equal to the number of sub-pixel groups in a row of sub-pixels arranged in the second direction.

Accordingly, sub-pixel groups in a pixel island corresponding to a first data-selection circuit can be provided with data signals via the first data-selection circuit.

In some embodiments, each of the first data-selection circuit includes j multiplexers.

The number of first data-selection control lines is j*f, the number of the first data-selection circuits is m, and the number of the first data input lines is n. Here, m and n satisfy an equation of n=m+j−1.

In each continuous j first data-selection circuits, j multiplexers electrically connected with different first data-selection control lines are electrically connected with one of first data input lines, where j is a positive integer less than m.

In some embodiments, as shown in FIG. 11, and FIG. 12, each of the first data-selection circuits 15 includes two multiplexers, that is, the first multiplexer 18 and the second multiplexer 19.

The number m of the first data-selection circuits 15 and the number n of the first data input lines D satisfy an equation of n=m+1.

In some embodiments, indexes of the first data input lines D can start with 0. In this case, the indexes of n first data input lines can be indicated as D0~Dm. As shown in FIG. 11, the first data-selection circuit 15 at the leftmost side of FIG. 11 is the first one of the first data-selection circuits 15. The first multiplexer 18 of the first one of the first data-selection circuits 15 and the second multiplexer 19 of the second one of the first data-selection circuits 15 are electrically connected with the first data input line with index of D1. In some embodiments, the second multiplexer 19 of the first one of the first data-selection circuits is electrically connected with the first data input line with index of D0. The first multiplexer 18 of the m-th one of the first data-selection circuits 15 is electrically connected with the first data input line with index of Dm.

In some embodiments, one multiplexer includes f transistors. The control ends of different transistors are electrically connected with different first data-selection control line. The first ends of different transistors are electrically connected with the same first data input line. The second ends of different transistors are electrically connected with different data lines.

In each first data-selection circuit, the second ends of the i-th transistors in different multiplexers are electrically connected with the same data line.

In some embodiments, when the first data-selection circuit includes two multiplexers, as shown in FIG. 11, the first multiplexer 18 includes f third transistors T3. The control ends of different third transistors T3 are electrically connected with different first data-selection control lines MUX. The first ends of different third transistors T3 are electrically connected with the same first data input line D. The second ends of different transistors T3 are electrically connected with different data lines 3.

The second multiplexer 19 includes f fourth transistors T4. The control ends of different fourth transistors T4 are electrically connected with different first data-selection control lines MUX. The first ends of different fourth transistors T4 are electrically connected with the same first data input line D. The second ends of different fourth transistors T4 are electrically connected with different data lines 3.

In each first data-selection circuit 15, the second end of the i-th third transistor T3i in the first multiplexer 18 and the second end of the i-th fourth transistor T4i in the second multiplexer 19 are electrically connected with the same data line 3.

In some embodiments, the third transistor and the fourth transistor are P-type transistors or N-type transistors. In this case, it is convenient to control the first data-selection circuits via the first data-selection control lines.

Alternatively, one of the third transistor and the fourth transistor is a P-type transistor, and the other one is an N-type transistor.

In some embodiments, the display panel includes 2f first data-selection control lines.

The f first data-selection control lines of the 2f first data-selection control lines are electrically connected with the control end of each third transistor in the first multiplexer. The other f first data-selection control lines of the 2f first data-selection control lines are electrically connected with the control end of each fourth transistor in the second multiplexer.

In some embodiments, as shown in FIG. 11, the control ends of the i-th third transistors T3i in different first data-selection circuits 15 are electrically connected with the same first data-selection control line MUX.

The control ends of the i-th fourth transistors T4i in different first data-selection circuits are electrically connected with the same first data-selection control line MUX.

It should be noted that, as an example, FIG. 11 illustrates that the control ends of the i-th third transistors T3i in different first data-selection circuits are electrically connected with the same first data-selection control line MUX, the control ends of the i-th fourth transistors in different first data-selection circuits are electrically connected with the same first data-selection control line MUX, and the display panel includes 2f first data-selection control lines. Of course, in some embodiments, the control ends of the i-th third transistors T3i in different first data-selection circuits may be electrically connected with different first data-selection control lines MUX, and the control ends of the i-th fourth transistors T4i in different first data-selection circuits may be electrically connected with different first data-selection control lines MUX. The display panel includes the first data-selection control lines, the number of which is an integer multiple of 2f.

In some embodiments, as shown in FIG. 11, each sub-pixel row 6 in the pixel island 5 includes sixteen sub-pixels 4. Each sub-pixel row 6 is divided into four sub-pixel groups 17. Each of the sub-pixel groups 17 includes four sub-pixels 4.

Each multiplexer 16 includes four input ends, one control end and four output ends.

Next, the display panel as shown in FIG. 11 provided by embodiments of the present disclosure will be illustrated by taking each sub-pixel group including four sub-pixels as an example.

In some embodiments, as shown in FIG. 11, the first multiplexer 18 includes four third transistors T31, T32, T33 and T34. The second multiplexer 19 includes four fourth transistors T41, T42, T43 and T44.

In some embodiments, as shown in FIG. 11, the display panel includes eight first data-selection control lines MUX, which are indicated as MUX1, MUX2, MUX3, MUX4, MUX5, MUX6, MUX7 and MUX8 respectively. The control end of the first one of the third transistors T31 in each of the first data-selection circuits 15 is electrically connected with the first data-selection control line MUX1. The control end of the first one of the fourth transistors T41 in each of the first data-selection circuits 15 is electrically connected with the first data-selection control line MUX2. The control end of the second one of the third transistors T32 in each of the first data-selection circuits 15 is electrically connected with the first data-selection control line MUX3. The control end of the second one of the fourth transistors T42 in each of the first data-selection circuits 15 is electrically connected with the first data-selection control line MUX4. The control end of the third one of the third transistors T33 in each of the first data-selection circuits 15 is electrically connected with the first data-selection control line MUX5. The control end of the third one of the fourth transistors T43 in each of the first data-selection circuits 15 is electrically connected with the first data-selection control line MUX6. The control end of the fourth one of the third transistors T34 in each of the first data-selection circuits 15 is electrically connected with the first data-selection control line MUX7. The control end of the fourth one of the fourth transistors T44 in each of the first data-selection circuits 15 is electrically connected with the first data-selection control line MUX8.

In some embodiments, as shown in FIG. 11, in each of the first data-selection circuits 15, an output end of the first one of the third transistors T31 and an output end of the first one of the fourth transistors T41 are electrically connected with the same data line 3; an output end of the second one of the third transistors T32 and an output end of the second one of the fourth transistors T42 are electrically connected with the same data line 3; an output end of the third one of the third transistors T33 and an output end of the third one of the fourth transistors T43 are electrically connected with the same data line 3; and an output end of the fourth one of the third transistors T34 and an output end of the fourth one of the fourth transistors T44 are electrically connected with the same data line 3.

In some embodiments, as shown in FIG. 11, in each of the first data-selection circuits 15, input ends of the third transistor T31, T32, T33, T34 are electrically connected with the same first data input line D; input ends of the fourth transistor T41, T42, T43, T44 are electrically connected with the same first data input line D; the input ends of the third transistor T31, T32, T33, T34 and the input ends of the fourth transistor T41, T42, T43, T44 are electrically connected with different first data input lines D. For an example, as shown in FIG. 11, from left to right, in the first one of the first data-selection circuits 15, input ends of the third transistor T31, T32, T33, T34 are electrically connected with the first data input line D1, input ends of the fourth transistor T41, T42, T43, T44 are electrically connected with the first data input line DO; in the second one of the first data-selection circuits 15, input ends of the third transistor T31, T32, T33, T34 are electrically connected with the first data input line D2, input ends of the fourth transistor T41, T42, T43, T44 are electrically connected with the first data input line D1; in the third one of the first data-selection circuits 15, input ends of the third transistor T31, T32, T33, T34 are electrically connected with the first data input line D3, input ends of the fourth transistor T41, T42, T43, T44 are electrically connected with the first data input line D2, and so on, and repeated descriptions will not be illustrated.

It should be noted that in some embodiments, the viewpoints should correspond to red sub-pixels, blue sub-pixels and green sub-pixels. Next, a correspondence between the sub-pixels and the viewpoints will be illustrated by taking one sub-pixel row in a pixel island including sixteen sub-pixels as an example.

Figure 16:
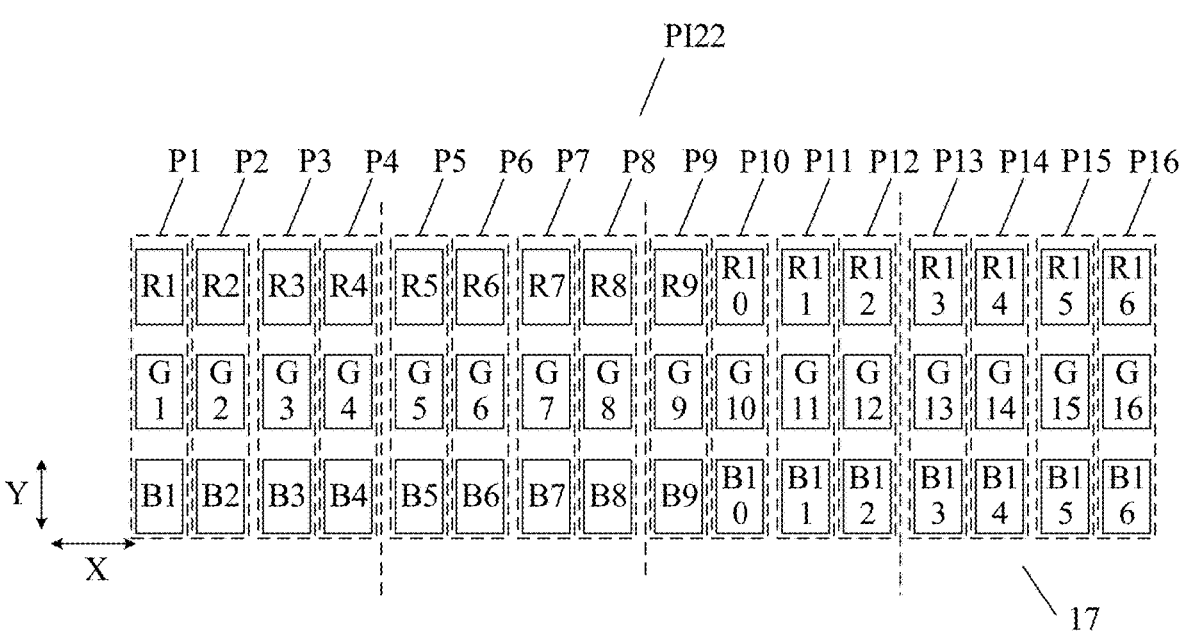
FIG. 16 is a schematic diagram for illustrating correspondence between pixels in a pixel island in a display panel and viewpoints according to an embodiment of the present disclosure.

When one pixel island corresponds to sixteen viewpoints, sub-pixels in the same row in each sub-pixel group of the pixel island should display different display information. In some display conditions, for an example, as shown in FIG. 16, the i-th viewpoint Pi corresponds to sub-pixels Ri, Gi, Bi of the first pixel island PI22, here, i is a positive integer less than or equal to 16. Taking the first pixel island is electrically connected with the first four of the first data-selection circuits arranged from left to right as shown in FIG. 11 as an example, in some embodiments, data signal corresponding to the viewpoints Pi-P4i can be supplied to the first data input line Di in sequence, and the third transistors T31, T32, T33, T34 in the first data-selection circuit can be controlled to be turned on in sequence through the first data-selection control lines MUX1, MUX3, MUX5, MUX7, and the fourth transistors T41, T42, T43, T44 in the first data-selection circuit can be controlled to be turned off through the first data-selection control lines MUX2, MUX4, MUX6, MUX8.

Figure 17:
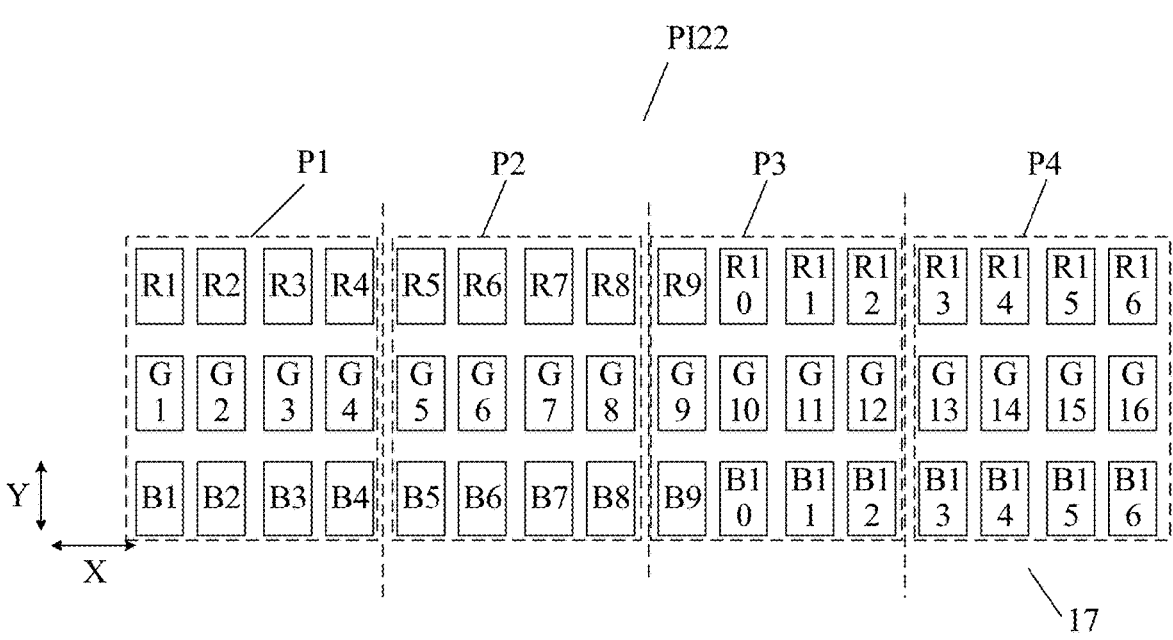
FIG. 17 is a schematic diagram for illustrating correspondence between pixels in a pixel island in a display panel and viewpoints according to an embodiment of the present disclosure.

When one pixel island corresponds to four viewpoints, that is, four sub-pixels in each row in the pixel island are used for display in combination. In some embodiments, for an example, as shown in FIG. 17, the i-th viewpoint Pi corresponds to sub-pixels R4i-3~R4i, G4i-3~G4i, B4i-3~B4i of the first pixel island PI22, where i is a positive integer less than or equal to 4. In some embodiments, data signals corresponding to the viewpoints Pi can be provided to the first data input line Di in sequence, and the third transistors T31, T32, T33, T34 in the first data-selection circuit can be controlled to be turned on at the same time through the first data-selection control lines MUX1, MUX3, MUX5, MUX7, and the fourth transistors T41, T42, T43, T44 in the first data-selection circuit can be controlled to be turned off through the first data-selection control lines MUX2, MUX4, MUX6, MUX8.

Figure 18:
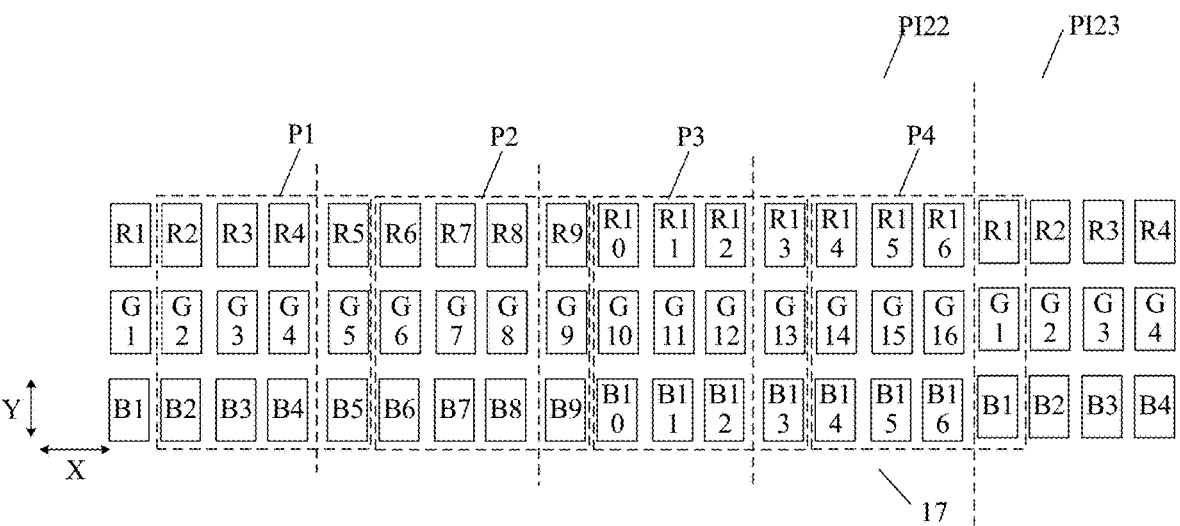
FIG. 18 is a schematic diagram for illustrating correspondence between pixels in a pixel island in a display panel and viewpoints according to an embodiment of the present disclosure.

In some cases, for an example, when a user's eyes move, the sub-pixels corresponding to viewpoints are translated to the right in FIG. 17, such as, at a step of one sub-pixel, sub-pixels corresponding to viewpoints in a user gaze zone are shown in FIG. 18. In this case, the first viewpoint P1 corresponds to sub-pixels R2~R5, G2~G5, B2~B5 in the first pixel island PI22, the second viewpoint P2 corresponds to sub-pixels R6~R9, G6~G9, B6~B9 in the first pixel island PI22, the third viewpoint P3 corresponds to sub-pixels R10~R13, G10~G13, B10~B13, the fourth viewpoint P4 corresponds to sub-pixels R14~R16, G14~G16, B14~B16 in the first pixel island PI22 and corresponds to sub-pixels R1, G1, B1 in the second pixel island PI23. In some embodiments, the data signal d4 is input into the first data input line D0, the data signal d1 is input into the first data input line D1, the data signal d2 is input into the first data input line D2, the data signal d3 is input into the first data input line D3, and the data signal d4 is input into the first data input line D4. The first data-selection control signal is provided to the first data-selection control lines MUX2, MUX3, MUX5 and MUX7 so as to control the transistors T41, T32, T33, T34 in each first data-selection circuit to be turned on, and the second data-selection control signal is provided to the first data-selection control lines MUX1, MUX4, MUX6, MUX8 to control the transistors T31, T42, T43, T44 in each first data-selection circuit to be turned off.

Figure 19:
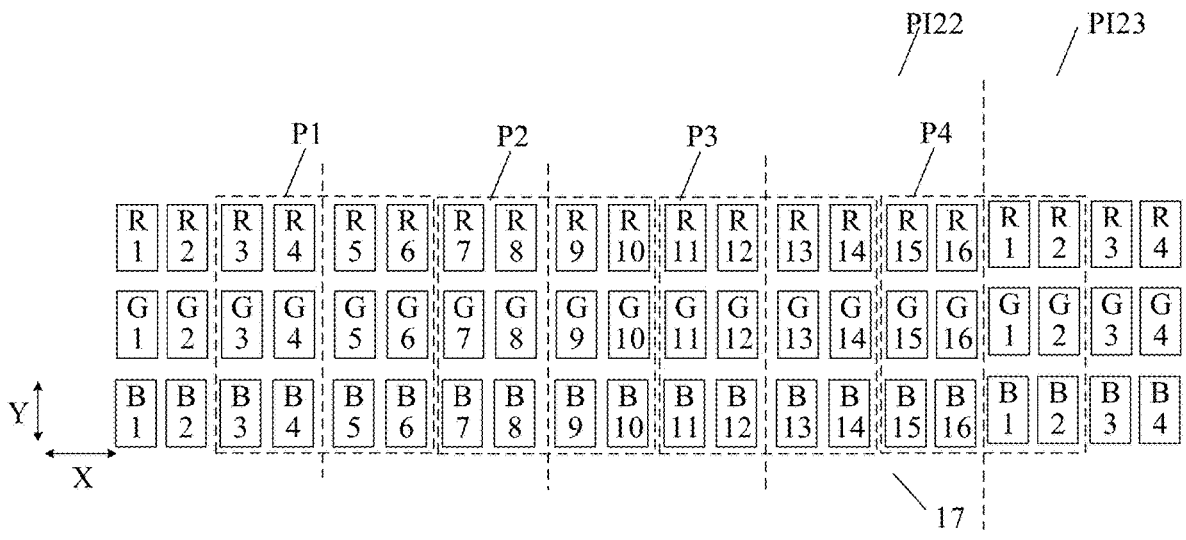
FIG. 19 is a schematic diagram for illustrating correspondence between pixels in a pixel island in a display panel and viewpoints according to an embodiment of the present disclosure.

In some embodiments, for an example, when the user's eyes move continuously, the sub-pixels corresponding to the viewpoints are translated to the right in FIG. 18 again at a step of one sub-pixel, sub-pixels corresponding to viewpoints in the user gaze zone are shown in FIG. 19. In this case, the first viewpoint P1 corresponds to sub-pixels R3~R6, G3~G6, B3~B6 in the first pixel island PI22, the second viewpoint P2 corresponds to sub-pixels R7~R10, G7~G10, B7~B10 in the first pixel island PI22, the third viewpoint P3 corresponds to sub-pixels R11~R14, G11~G14, B11~B14, the fourth viewpoint P4 corresponds to sub-pixels R15~R16, G15~G16, B15~B16 in the first pixel island PI22 and corresponds to sub-pixels R1~R2, G1~G2, B1~B2 in the second pixel island PI23. In some embodiments, the data signal d4 is input into the first data input line D0, the data signal d1 is input into the first data input line D1, the data signal d2 is input into the first data input line D2, the data signal d3 is input into the first data input line D3, and the data signal d4 is input into the first data input line D4, and the first data-selection control signal is provided to the first data-selection control lines MUX2, MUX4 MUX 5 and MUX7 so as to control the transistors T41, T42, T33 and T34 in each first data-selection circuit to be turned on, and the second data-selection control signal is provided to the first data-selection control lines MUX1, MUX3, MUX6, MUX8 to control the transistors T31, T32, T43, and T44 in each first data-selection circuit to be turned off.

Alternatively, in some embodiments, as shown in FIG. 12, one multiplexer 16 includes f switch circuits 20.

In some embodiments, when the first data-selection circuit 15 includes two multiplexers, as shown in FIG. 12, the first multiplexer 18 includes f first switch circuits 22, the second multiplexer 19 includes f second switch circuits 24.

In the same first data-selection circuit 15, control ends of different switch circuits 20 are electrically connected with different first data-selection control lines MUX; input ends of different first switch circuits 22 are electrically connected with the same first data input line D; input ends of different second switch circuits 24 are electrically connected with the same first data input line D; output ends of different first switch circuits 22 are electrically connected with different data lines 3; output ends of different second switch circuits 24 are electrically connected with different data lines 3; and an output end of the i-th first switch circuit 22 and an output end of the i-th second switch circuit 24 are electrically connected with the same data line 3.

In some embodiments, as shown in FIG. 12, the i-th first switch circuits 22 in different first data-selection circuits 15 are electrically connected with the same first data-selection control line MUX; and the i-the second switch circuits 24 in different first data-selection circuits 15 are electrically connected with the same first data-selection control line MUX. In this case, the display panel includes 2f first data-selection control lines MUX.

Figure 13:
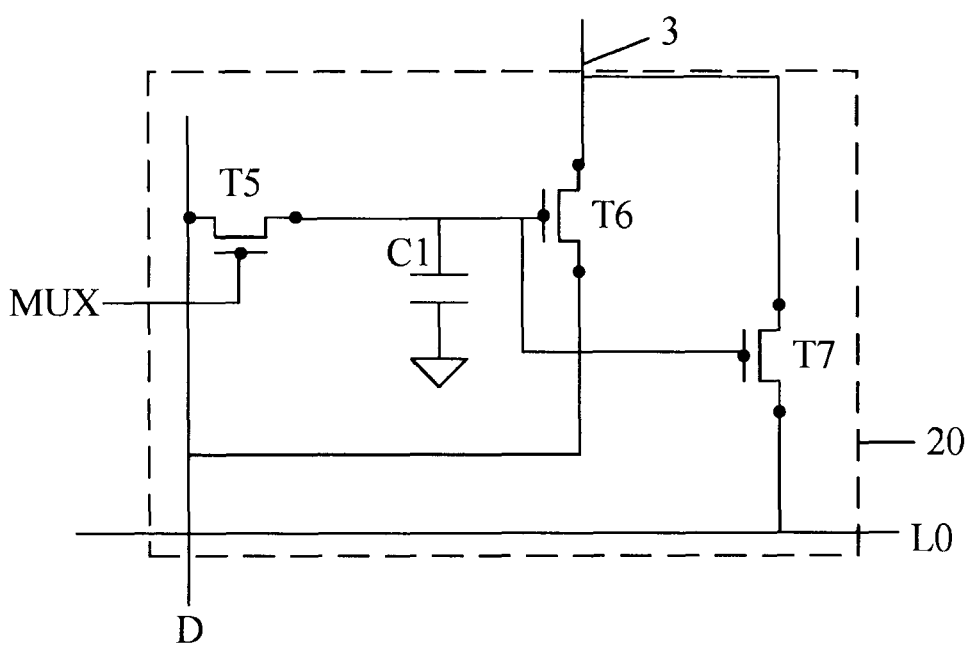
FIG. 13 is a schematic structural diagram of a switch circuit for a display panel according to an embodiment of the present disclosure.

In some embodiments, as shown in FIG. 13, each switch circuit 20 includes a fifth transistor T5, a sixth transistor T6, a seventh transistor T7 and a first capacitor C1.

A control end of the fifth transistor T5 is electrically connected with the first data-selection control line MUX; a first end of the fifth transistor T5 and a first end of the sixth transistor T6 are electrically connected with the first data input line D; a second end of the fifth transistor T5, a control end of the sixth transistor T6 and a control end of the seventh transistor T7 are electrically connected with a first end of the first capacitor C1; a second end of the sixth transistor T6 and a second end of the seventh transistor T7 are electrically connected with the data line 3; and a second end of the capacitor C1 is grounded.

The display panel further includes a dummy signal line L0 electrically connected with a first end of the seventh transistor T7.

In some embodiments, the first end of the seventh transistor in each switch circuit is electrically connected with the same dummy signal line.

In some embodiments, there is no signal input into the dummy signal line.

In some embodiments, one of the sixth transistor and the seventh transistor is an N-type transistor, the other one is a P-type transistor, so that one of the sixth transistor and the seventh transistor is turned on while the other one is turned off, in order to connect the first data input line with the data line or connect the data line with the dummy signal line.

Figure 14:
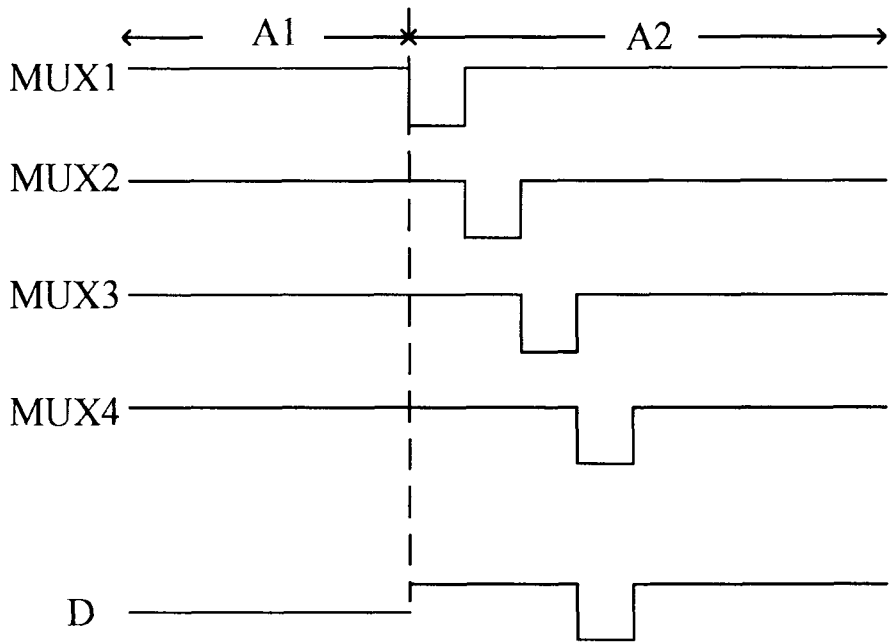
FIG. 14 is a timing chart for a display panel according to an embodiment of the present disclosure.
Figure 15:
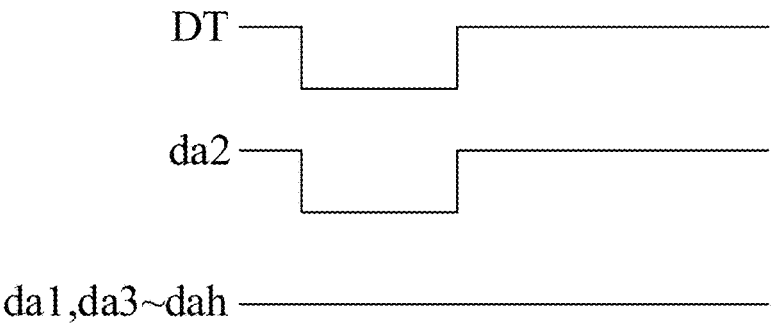
FIG. 15 is a timing chart for data lines of a display panel according to an embodiment of the present disclosure.

When each switch circuit includes a circuit structure as shown in FIG. 13, a corresponding timing chart is as shown in FIG. 14. A phase A1 is for display within one frame; and a phase A2 is for black frame insertion within one frame. The signals provided by the first data input line D include a gating level so as to determine which data line should the first data input line be connected with in next frame. For an example, the first data-selection control lines MUX in FIG. 14 are supplied with signals so as to scan each of the first data-selection circuits row-by-row. As shown in FIG. 15, a switch circuit electrically connected the first data-selection control line MUX4 is selected to be turned on according to the signals provided by the first data input line. In other words, the second data line da2 in h data lines corresponding to each pixel island is enabled, and grayscale signals are transmitted on the second data line da2 in the h data lines corresponding to each pixel island in the next frame, and direct-current signals are transmitted through other data lines da1, da3~dah in the h data lines corresponding to each pixel island. The first data-selection circuits are controlled by the first data input control lines based on the time sequence shown in FIG. 14, so as to keep the sampling time for charging unchanged, and save system resources.

It should be noted that FIG. 14 is merely shown for illustration by taking signals of the first data-selection control lines MUX1~MUX4 as examples.

Next, the display panel as shown in FIG. 12 and provided by the present disclosure will be explained by taking each sub-pixel group including four sub-pixels as an example.

In some embodiments, as shown in FIG. 12, the first multiplexer 18 includes four first switch circuits 22; the second multiplexer 19 includes four second switch circuits 24. The display panel includes eight first data-selection control lines MUX, which are indicated as MUX1, MUX2, MUX3, MUX4, MUX5, MUX6, MUX7 and MUX8.

Here, a control end of the fifth transistor T5 of the first one of first switch circuits 22 in each first data-selection circuit 15 is electrically connected with the first data-selection control line MUX1. A control end of the fifth transistor T5 of the first one of the second switch circuits 24 in each first data-selection circuit 15 is electrically connected with the first data-selection control line MUX2. A control end of the fifth transistor T5 of the second one of the first switch circuits 22 in each first data-selection circuit 15 is electrically connected with the first data-selection control line MUX3. A control end of the fifth transistor of the second one of the second switch circuits 24 in each first data-selection circuit 15 is electrically connected with the first data-selection control line MUX4. A control end of the fifth transistor T5 of the third one of the first switch circuits 22 in each first data-selection circuit 15 is electrically connected with the first data-selection control line MUX5. A control end of the fifth transistor T5 of the third one of the second switch circuits 24 in each first data-selection circuit 15 is electrically connected with the first data-selection control line MUX6. A control end of the fifth transistor T5 of the fourth one of the first switch circuits 22 in each first data-selection circuit 15 is electrically connected with the first data-selection control line MUX7. A control end of the fifth transistor T5 of the fourth one of the second switch circuits 24 in each first data-selection circuit 15 is electrically connected with the first data-selection control line MUX8.

In each first data-selection circuit 15, a second end of the sixth transistor T6, a second end of the seventh transistor T7 in the first one of the first switch circuits 22, and a second end of the sixth transistor T6, a second end of the seventh transistor T7 in the first one of the second switch circuits 24 are electrically connected with the same data line 3; a second end of the sixth transistor T6, a second end of the seventh transistor T7 in the second one of the first switch circuits 22, and a second end of the sixth transistor T6, a second end of the seventh transistor T7 in the second one of the second switch circuits 24 are electrically connected with the same data line 3; a second end of the sixth transistor T6, a second end of the seventh transistor T7 in the third one of the first switch circuits 22, and a second end of the sixth transistor T6, a second end of the seventh transistor T7 in the third one of the second switch circuits 24 are electrically connected with the same data line 3; and a second end of the sixth transistor T6, a second end of the seventh transistor T7 in the fourth one of the first switch circuits 22, and a second end of the sixth transistor T6, a second end of the seventh transistor T7 in the fourth one of the second switch circuits 24 are electrically connected with the same data line 3.

In each first data-selection circuit 15, a first end of the fifth transistor T6 and a first end of the sixth transistor T6 in each first switch circuit 22 are electrically connected with the same first data input line D; a first end of the fifth transistor T6 and a first end of the sixth transistor T6 in each second switch circuit 24 are electrically connected with the same first data input line D.

When one pixel island corresponds to sixteen viewpoints, the same row of sub-pixels in each sub-pixel group of the pixel island need to be configured with different display information. In some display cases, for an example, as shown in FIG. 16, the i-th viewpoint Pi corresponds to sub-pixels Ri, Gi, Bi in the first one of pixel islands P122, where i is an positive integer less than or equal to 16. Taking that the first pixel island 12 is electrically connected with the first four of first data-selection circuits arranged from left to right in FIG. 12 as an example, in some embodiments, the first data input lines Di can be supplied with data signals corresponding to viewpoints Pi~P4i and including a gating level, and the fifth transistors T5 of the switch circuits 20 in the first data-selection circuits can be turned on in sequence under the control of the first data-selection control lines MUX1, MUX3, MUX5 and MUX7, the sixth transistors T6 of the first switch circuits 22 can be turned on in sequence and the seventh transistors T7 of the first switch circuits 22 can be turned off under the control of data signals including the gating level. In this case, the fifth transistors T5 in the second switch circuits 24 can be turned off under control of the first data-selection control lines MUX2, MUX4, MUX6, and MUX8.

When one pixel island corresponds to four viewpoints, that is, four sub-pixels in each row of the pixel island are used for display in combination. In some cases, as shown in FIG. 17, the i-th viewpoint Pi corresponds to sub-pixels R4i-3~R4i, G4i3~G4i, B4i in the first one of pixel islands PI22, where i is an positive integer less than or equal to 4. In some embodiments, the first data input lines Di can be supplied with data signals corresponding to viewpoints Pi and including a gating level, and the fifth transistors T5 of the first switch circuits can be turned on simultaneously under the control of the first data-selection control lines MUX1, MUX3, MUX5 and MUX7, the sixth transistors T6 of the switch circuits electrically connected with the first data-selection control lines MUX1, MUX3, MUX5, MUX7 can be turned on simultaneously under the control of data signals transmitted by the first data input lines and including the gating level, and the seventh transistors T7 of the switch circuits electrically connected with the first data-selection control lines MUX1, MUX3, MUX5, MUX7 can be turned off under the control of the data signals transmitted by the first data input lines and including the gating level; the fifth transistor T5 of the second switch circuits 24 can be turned off under the control of the first data-selection control lines MUX2, MUX4, MUX6 and MUX8.

In some embodiments, for an example, when a user's eyes move, the sub-pixels corresponding to the viewpoints are translated toward the right in FIG. 17. When the sub-pixels corresponding to the viewpoints are translated at a step of one sub-pixel, sub-pixels corresponding to the viewpoints in a user gaze zone are as shown in FIG. 18. In some embodiments, a data signal d4 including the gating level is input to the first data input line D0; a data signal d1 including the gating level is input to the first data input line D1; a data signal d2 including the gating level is input to the first data input line D2; a data signal d3 including the gating level is input to the first data input line D3; a data signal d4 including the gating level is input to the first data input line D4; and the first data-selection control signals are supplied to the first data-selection control lines MUX2, MUX3, MUX5 and MUX7 simultaneously so that the fifth transistors T5 in the switch circuits electrically connected with the first data-selection control lines MUX2, MUX3, MUX5 and MUX7 can be turned on simultaneously, and the sixth transistors T6 in the switch circuits electrically connected with the first data-selection control lines MUX2, MUX3, MUX5 and MUX7 can be turned on simultaneously under the control of data signals including the gating level. The second data-selection control signals are supplied to the first data-selection control lines MUX1, MUX4, MUX6 and MUX8 so that the fifth transistors T5 in switch circuits electrically connected with the first data-selection control lines MUX1, MUX4, MUX6 and MUX8 can be turned off.

In some display cases, for an example, when the user's eyes move continuously, so that the sub-pixels corresponding to the viewpoints are translated toward right in FIG. 18 at a step of one sub-pixel again, the sub-pixels corresponding to the viewpoints in the user gaze zone are as shown in FIG. 19. In some embodiments, a data signal d4 including the gating level is input to the first data input line D0; a data signal d1 including the gating level is input to the first data input line D1; a data signal d2 including the gating level is input to the first data input line D2; a data signal d3 including the gating level is input to the first data input line D3; a data signal d4 including the gating level is input to the first data input line D4. The first data-selection control signals are supplied to the first data-selection control lines MUX2, MUX4, MUX5 and MUX7 simultaneously so that the fifth transistors T5 in switch circuits electrically connected with the first data-selection control lines MUX2, MUX4, MUX5 and MUX7 can be turned on simultaneously, and the sixth transistors T6 in the switch circuits electrically connected with the first data-selection control lines MUX2, MUX4, MUX5 and MUX7 can be turned on simultaneously under the control of data signals including the gating level. The second data-selection control signals are supplied to the first data-selection control lines MUX1, MUX3, MUX6 and MUX8 so that the fifth transistors T5 in switch circuits electrically connected with the first data-selection control lines MUX1, MUX3, MUX6 and MUX8 can be turned off.

In some embodiments, the first transistor, the second transistor, the third transistor, the fourth transistor, the fifth transistor, the sixth transistor, and the eighth transistor can be Metal-Oxide-Semiconductor Field-Effect Transistor (MOSFET), Complementary Metal-Oxide-Semiconductor (CMOS) Transistor, or Thin Film Transistor (TFT).

Embodiments of the present disclosure provide a display device, as shown in figures, the display device includes:
the display panel provided by embodiments of the present disclosure;

a cylindrical lens structure arranged at a light-emitting side of the display panel, and the cylindrical lens structure including a plurality of cylindrical lenses arranged at array;
a controller in connection with the display panel, and configured to supply an individual driving signal to each control zone.

Figure 20:
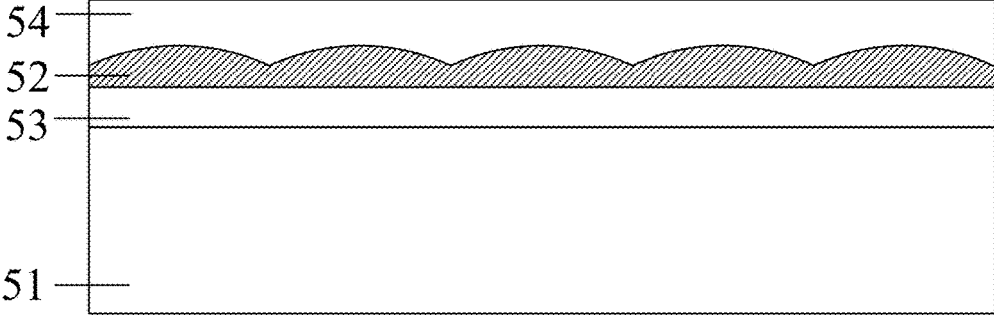
FIG. 20 is a schematic structural diagram of a display device according to an embodiment of the present disclosure.

According to a same invention idea, embodiments of the present disclosure further provide a display device, as shown in FIG. 20, the display device includes:
the display panel 51 provided by embodiments of the present disclosure;
a cylindrical lens structure 52 arranged at a light-emitting side of the display panel 51, and the cylindrical lens structure 52 including a plurality of cylindrical lenses arranged at array;
a controller (not shown) in connection with the display panel, and configured to supply an individual driving signal to each control zone.

In some embodiments, as shown in FIG. 20, the display device further includes:
a light-transmitting spacer layer 53 arranged between the display panel 51 and the cylindrical lens structure 52;
a planarization layer 54 arranged on a side of the cylindrical lens structure 52 facing away from the light-transmitting spacer layer 53.

In some embodiments, when the display panel is a liquid crystal display panel, the display device as an example, further includes a backlight module arranged on a side of the display panel facing away from the cylindrical lens structure.

In some embodiments, the display device further includes an eye-tracking system configured to determine a user gaze zone on the display device in real time.

In some embodiments, during a process of displaying images, to zones which need to be refreshed, a normal scanning signal can be provided to scanning lines corresponding to pixel islands by driving the control circuit based on driving signals provided by the controller; to zones which do not need to be refreshed, a fixed potential signal transmitted by the fixed potential lines can be provided to the scanning lines corresponding to the pixel islands by driving the control circuit based on driving signals supplied by the controller, so that the pixel islands can be driven in zones and the power consumption of the display device can be saved. Moreover, corresponding signals can be supplied to the first data-selection control lines and the first data input lines through the controller to control sub-pixels of the pixel islands in a high-resolution display zone to display individually, and control sub-pixels of the pixel islands in a low-resolution display zone to display in combination, so as to further save the power consumption of the display device. In some embodiments, for an example, the user gaze zones correspond to zones of high refresh rate and high resolution, and non-gaze zones correspond to zones of low refresh rate and low resolution.

In some embodiments, the resolution in the 3D image display mode can be the same as the resolution in the 2D image display mode, since the sub-pixels are divided in a pixel island (serving as a pixel in 2D image display). The multi-viewpoints display with great visual angle can be achieved in combine with the eye-tracking technique and the 3D display with higher pixel density (PPI) can be achieved with greater amount of information, lower color crosstalk among adjacent viewpoints, and the dizzy feeling of users caused by watching 3D images can be lowered, improving the user experience. When the display device is provided with the cylindrical lens array, the cylindrical lens array can be used not only for pixel mapping for sub-pixels in the pixel islands, but also for modulation on light from the pixel island, to allow final emitting light from the pixel island to form a plurality of viewpoints and thereby to achieve a light-filed 3D display.

In some embodiments, each pixel island corresponds to M viewpoints, and each pixel island corresponds to N cylindrical lenses. Here, M and N are positive integers, M>N and M/N is a non-integer.

In should be noted that a resolution relative to human eyes, of caliber Dc of a cylindrical lens at a distance of distinct vision is less than a resolution of retina. This satisfies a requirement of an eye pupil of a single eye receiving at least two viewpoints at the same time, solves a problem of visual fatigue and dizziness caused by the vergence-accommodation conflict and meanwhile lowers the fixed lens' affection to 2D display within the closest watching scope. That is, $$P \le L \times \tan\left\{\frac{1}{60} \times \frac{3.1415926}{180}\right\},$$

L is the distance of distinct vision and is usually 250 millimeters (mm). In some embodiments, each sub-pixel row in a pixel island includes h sub-pixels. In each pixel island, the sub-pixels can correspond to h 3D viewpoint images through multi-gray scale drive rendering. A width P of the pixel island in an arrangement direction of the cylindrical lens can be configured in such a way that retina resolution at the optimum 3D watching distance can be achieved. That is, $$P \le L \times \tan\left\{\frac{1}{60} \times \frac{3.1415926}{180}\right\},$$

the Retina 3D angular resolution is guaranteed.

In some embodiments, in the display device provided by the present disclosure the viewpoints corresponding to the pixel islands can be segmented N times, where M/N is non-integer. The caliber of each cylindrical lens is Dc=N× (L+H), H is a distance between the display panel and the cylindrical lens.

In some embodiments, the sub-pixels in the pixel islands can be configured to emit light continuously. When a row of sub-pixels arranged in the first direction have the same color, a continuous light-emitting surface can be formed in the first direction, so as to achieve a multi-viewpoints light field display and meanwhile lower the crosstalk among the viewpoints, and eliminate 3D moiré.

Figure 21:
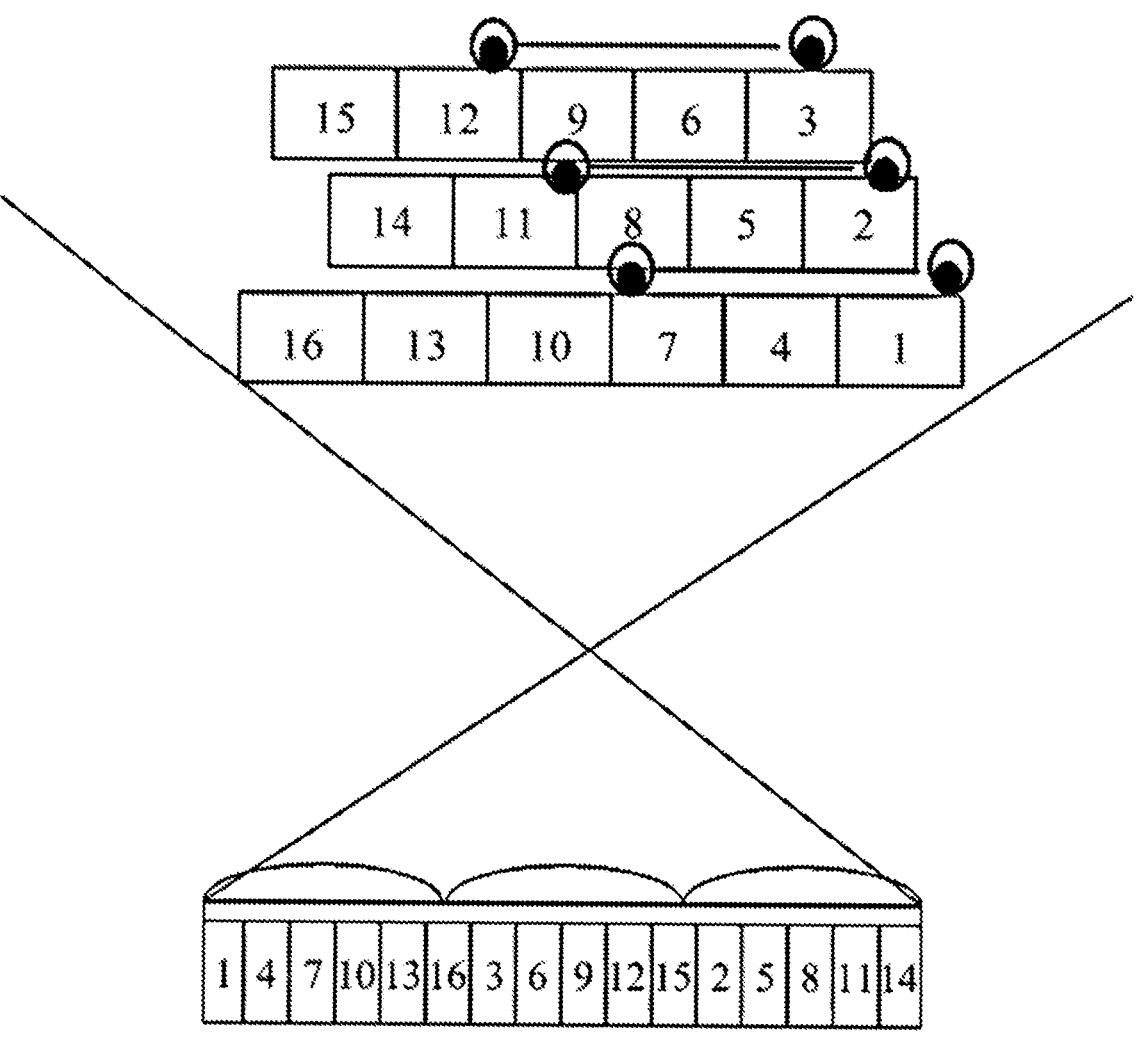
FIG. 21 is a schematic diagram for illustrating a distribution of a viewpoint space for a display device according to an embodiment of the present disclosure.

Embodiment 1: for sub-pixel segments for continuously emitting light, when the sub-pixels in the pixel island correspond to 16 viewpoints, i.e., M=h=16, an arrangement and a space and time distribution, of a row of sub-pixels in the pixel island is as shown in FIG. 21. For a row of sub-pixels in the pixel island, two of three cylindrical lenses correspond to five viewpoints, another cylindrical lens corresponds to six viewpoints. As shown in FIG. 21, when M/N is non-integer, the viewpoints corresponding to each cylindrical lens do not overlap completely, so as to avoid crosstalk among the viewpoints. Taking the viewpoints 1, 2, 3 as examples, the viewpoints 2, 3 can provide a splicing based compensation to the non-luminance viewpoint 1 through misalignment of the cylindrical lenses, so as to avoid moiré.

The sub-pixels in the pixel island can be configured to emit light discontinuously. The areas between adjacent sub-pixels in the first direction X correspond to light-shielding areas. Taking the display panel being a liquid crystal display panel as an example, the sub-pixels can be configured to emit light discontinuously as shown in FIG. 4 and FIG. 5.

In some embodiments, each sub-pixel row in the pixel island includes a light-shielding area. An area ratio of the sub-pixels to the light-shielding area is X, where X=N−1.

Figure 22:
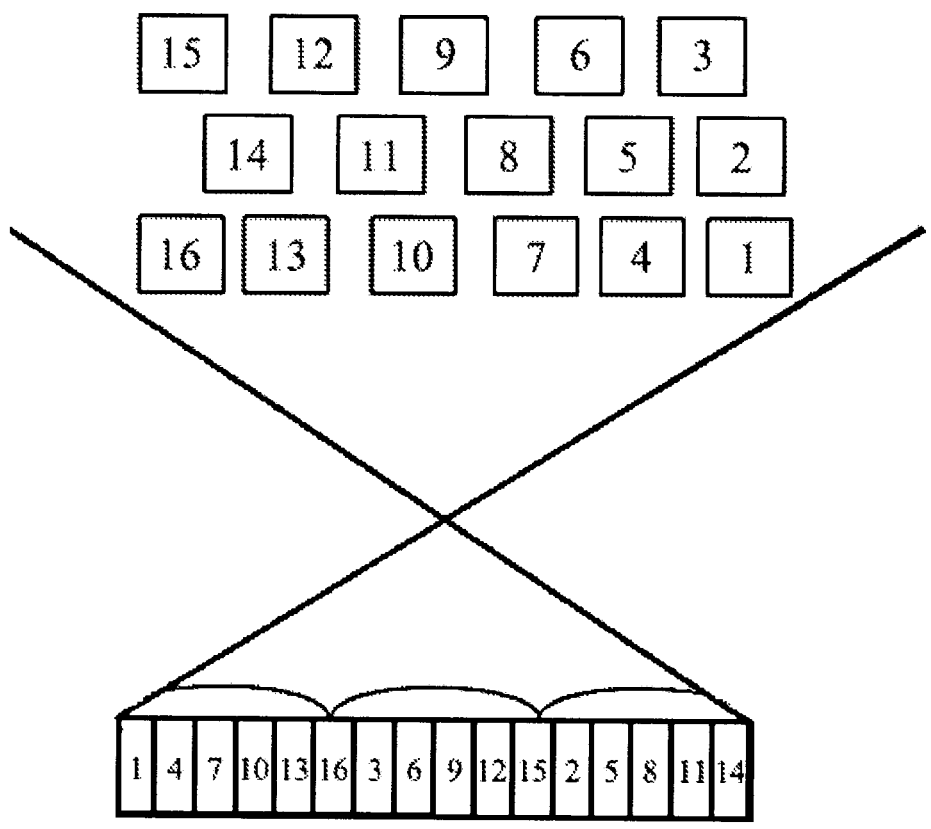
FIG. 22 is a schematic diagram for illustrating a distribution of a viewpoint space for a display device according to an embodiment of the present disclosure.
Figure 23:
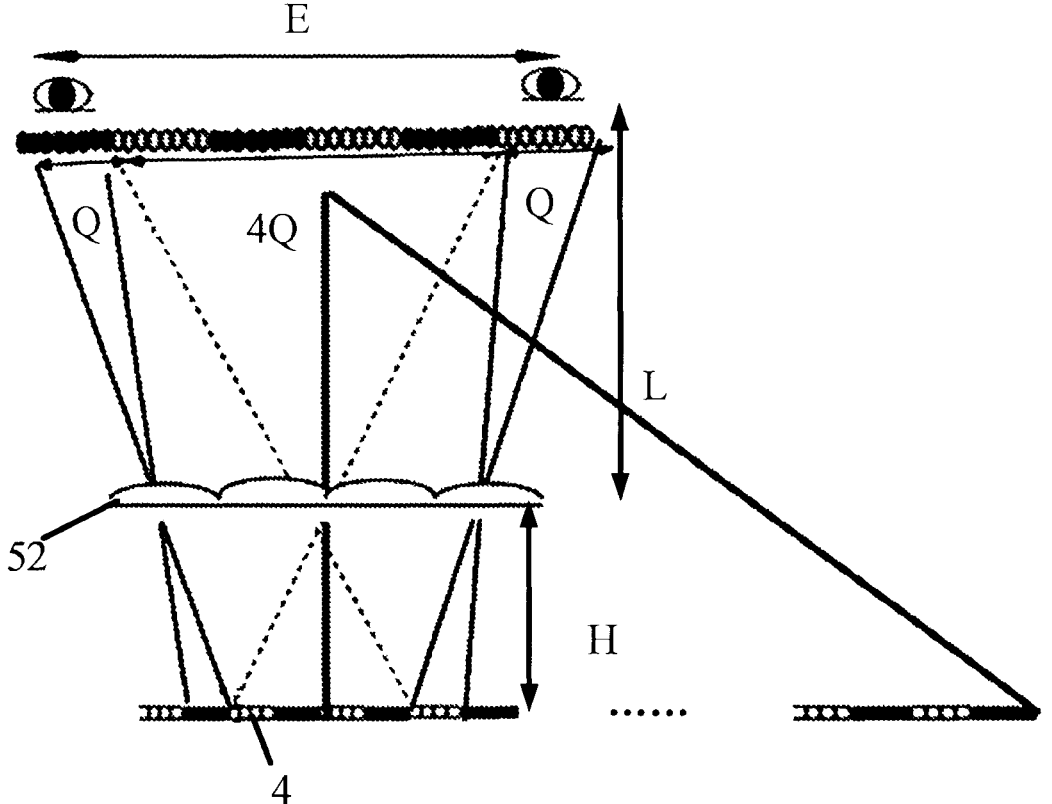
FIG. 23 is a schematic diagram for illustrating a visual area between both eyes of for display device according to an embodiment of the present disclosure.

When the sub-pixels in the pixel island correspond to 16 viewpoints, i.e., M=h=16. When the area ratio of the sub-pixels to the light-shielding area is 2:1, i.e., X=2, N=3, an arrangement of one row of sub-pixels in the pixel island and a distribution of the row of sub-pixels in space and time are as shown in FIG. 23. For a sub-pixel row in the pixel island, two of three cylindrical lenses correspond to five viewpoints, the other one corresponds to six viewpoints. As shown in FIG. 22, when M/N is non-integer, viewpoints corresponding to each cylindrical lens overlap in space incompletely, so that a crosstalk among the viewpoints can be avoided. Taking the viewpoints, 1, 2, 3 as examples, as shown in FIG. 22, the viewpoint 2 in the third cylindrical lens and the viewpoint 1 in the first cylindrical lens overlap in space incompletely; the viewpoint 2 and the viewpoint 3 overlap in space incompletely; the non-luminance of the viewpoint 1 is compensated based on splicing by the viewpoint 2 and the viewpoint 3 via the misalignment of the cylindrical lenses so as to avoid moiré.

In should be noted that the development of 3D display technique is greatly limited by the performance of display components and optical components. In the related art, the glass-free 3D generally has problems of not allowing free-movement watching, and limited watching scope. Especially for a light-field display, watching area and watching scope are much smaller, especially for display products in medium or big size, it is hard to achieve a light-field watching at a short range. Further, there are checks and balances between the resolution of the glass-free 3D and continuity of the viewpoints, and there is a serious crosstalk among viewpoints, so that a 3D image of singular-eye viewpoints becomes relative fizzy and has a lower contrast.

In some embodiments, the caliber Dc of the cylindrical lens and the width P of the pixel island in the arrangement direction of the cylindrical lens also satisfy following relationship:

$$\frac{D}{P} = \frac{L}{L+H}.$$

In some embodiments, a width Q of independent visual area for left and right eyes of user satisfies following condition:

$$Q = \frac{E}{2A+1}.$$

Here, E is a pupil distance of the user's eye pupil, A is the number of the cylindrical lenses between pixels islands corresponding to the left-eye viewpoints and the right-eye viewpoints.

In some embodiments, the width Q of independent visual area for left and right eyes of user further satisfies following condition:

$$Q = h\frac{e}{2M}.$$

Here, e is a size of the user's eye pupil. A normal size of eye pupil is about 3 mm~5 mm.

In some embodiments, each sub-pixel row of the pixel island includes h sub-pixels of same color. When a single eye pupil corresponds to 2 viewpoints, that is, if h=16, M=2, e=5 mm, and the viewpoints correspond to the cylindrical lenses in an one-to-one manner, then Q=20 mm, that is, pixels for the left and right eyes viewpoints can be projected to independent visual areas Q for left and right eyes watching through spaced lenses. FIG. 23 specifically illustrates a light path. The pixel island is divided into 16 sub-pixels, the left and right eyes correspond to 8 sub-pixels respectively. The black sub-pixels in the figure indicate sub-pixels corresponding to the left eye, the white sub-pixels indicate sub-pixels corresponding to the right eye. The pixels for the left and right eyes viewpoints are projected to the left and right eyes through two lenses spaced with two lenses. As shown in FIG. 23, a central area between the left and right eyes are 4Q, that is, a length of the central area between the left and right eyes is 80 mm.

Figure 24:
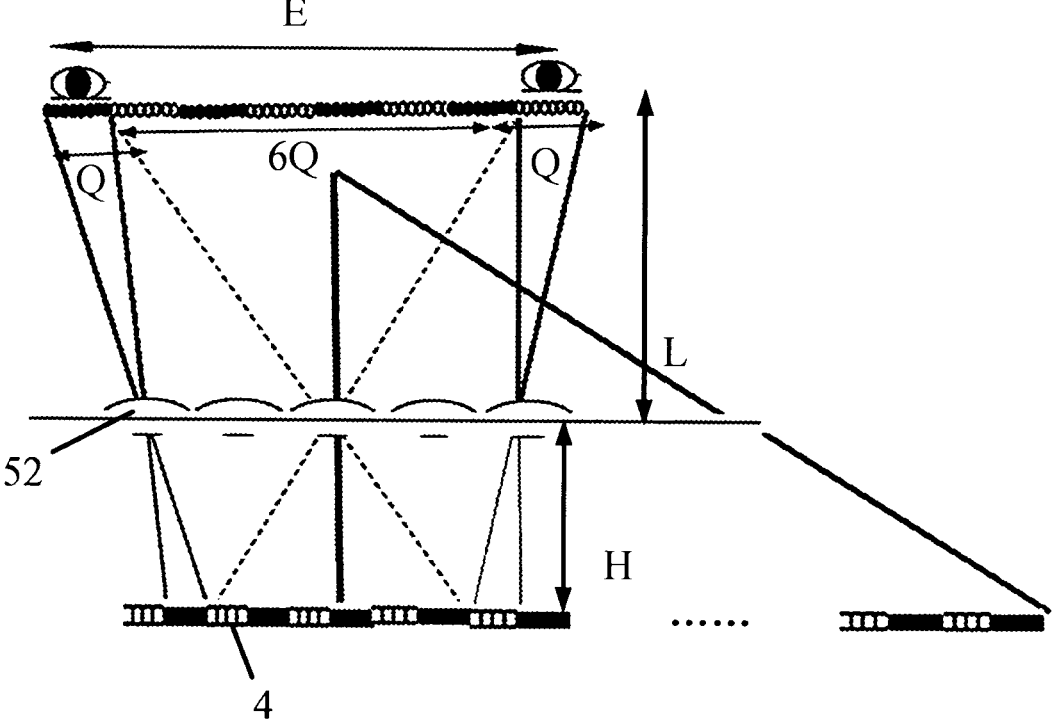
FIG. 24 is a schematic diagram for illustrating a visual area between both eyes for another display device according to an embodiment of the present disclosure.

In some embodiments, each sub-pixel row of the pixel island includes h sub-pixels of same color. When a single eye pupil corresponds to 4 viewpoints, that is, if h=16, M=4, e=5 mm, then Q=10 mm, that is, pixels for the left and right eyes viewpoints can be projected to independent visual areas Q for left and right eyes watching through spaced lenses. FIG. 24 specifically illustrates a light path. The left and right eyes correspond to 8 sub-pixels respectively. The black sub-pixels in the figure are sub-pixels corresponding to the left eye, the white sub-pixels are sub-pixels corresponding to the right eye. The pixels for the left and right eyes viewpoints are projected to the left and right eyes through two lenses spaced with two lenses. As shown in FIG. 24, a central area between the left and right eyes are 6Q, that is, a length of the central area between the left and right eyes is 60 mm.

The display device provided by embodiments of the present disclosure can display with a light field in which the length of the central area between the left and right eyes is about 60 mm, so that multi-depth light field images can be produced in the central area, a focusing control for single eye is achieved, a SMV 3D display with low crosstalk is achieved, and different angular 3D information is represented. In some embodiments, positions where the eyes focus can be fed back in combination with the eye-tracking system. The drive for the display panel can be adjusted through eye coordinates of the eye-tracking system received by a feedback unit, so as to adjust an image rendering mode to achieve the SMV 3D display with lower crosstalk in the light filed of central area and outside of the light field.

Figure 25:
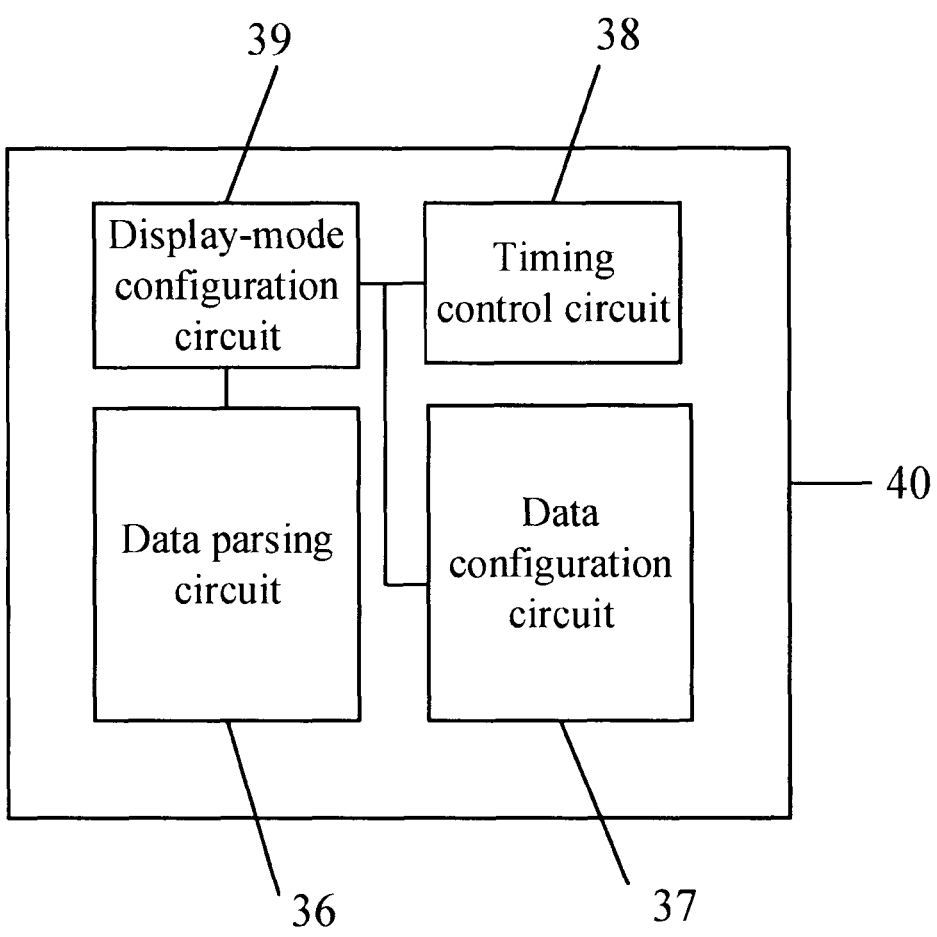
FIG. 25 is a schematic structural diagram of a controller according to an embodiment of the present disclosure.
Figure 27:
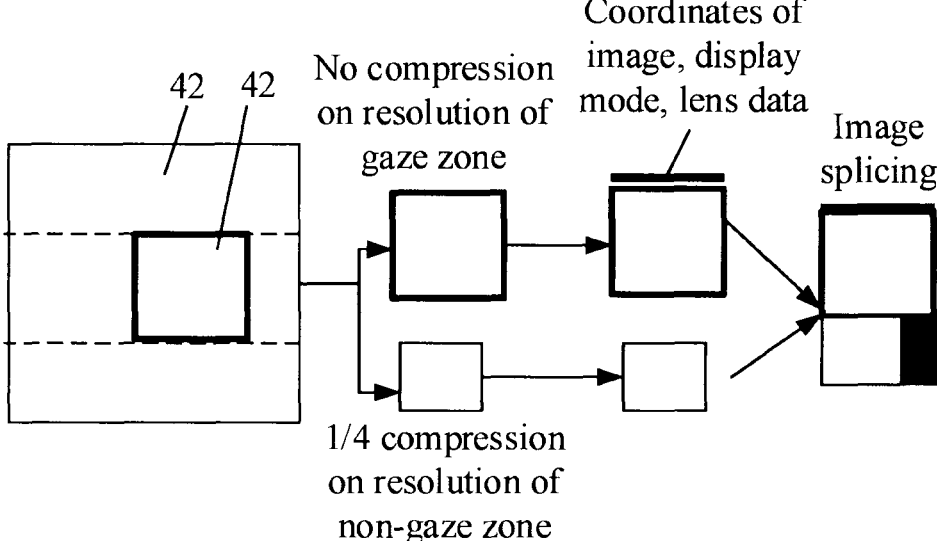
FIG. 27 is a schematic diagram for illustrating zone control for resolutions according to an embodiment of the present disclosure.

In some embodiments, as shown in FIG. 25, FIG. 27, the controller 40 includes:

a data parsing circuit 36 configured to perform data parsing on an image to be displayed to obtain a parsed image data;

a data configuration circuit 37 configured to generate a data driving signal corresponding to a control zone of the display panel according to a current display mode and the parsed image data;

a timing control circuit 38 configured to generate a gate driving signal of the gate drive circuit according to the current display mode and a gaze zone, a non-gaze zone of the display panel.

In some embodiments, the controller further includes a display-mode configuration circuit 39 configured to determine the current display mode according to the parsed image data.

In some embodiments, for an example, the display mode can be 2D display or 3D display. The 3D display mode includes a light-field display and a SMV display.

In some embodiments, as shown in FIG. 25, the controller is a Field Programmable Gate Array (FPGA).

In some embodiments, an output end of the timing control circuit of the FPGA is electrically connected with the gate driving circuit in the display panel. The data configuration circuit of the FPGA, for an example, can supply corresponding signals to the first data input line, the first data-selection control line in the display panel.

Figure 26:
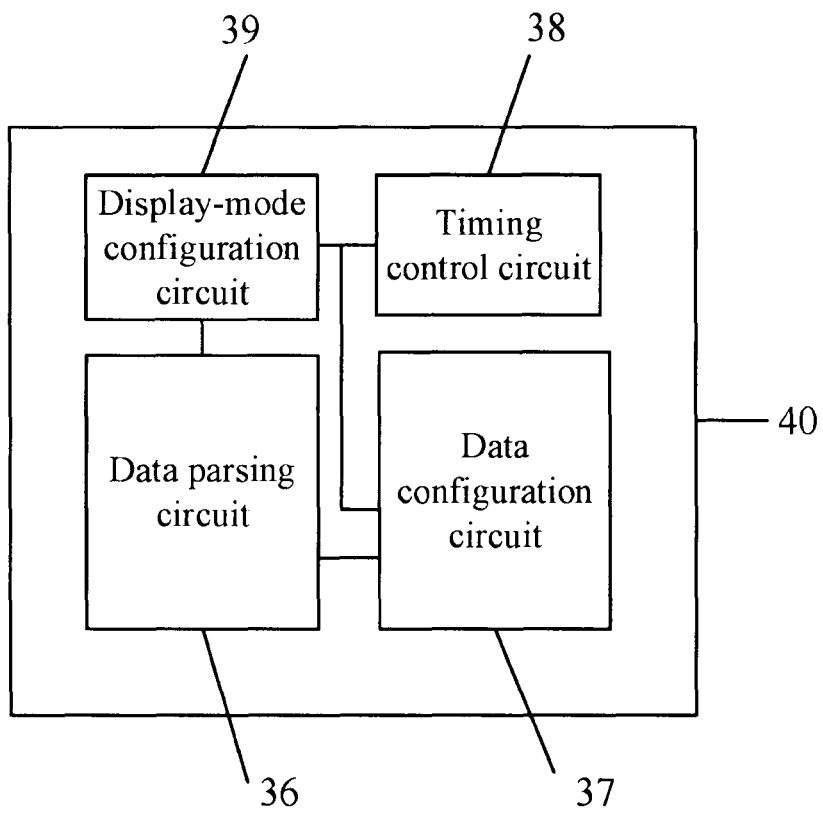
FIG. 26 is a schematic structural diagram of another controller according to an embodiment of the present disclosure.

Alternatively, in some embodiments, as shown in FIG. 26, the controller is a Timing Controller (TCON).

In some embodiments, the display-mode configuration circuit of the TCON is further configured for coordinate parsing and image processing according to the pared image data. The data configuration circuit decompresses processed data and configures data driving signals corresponding to control zones of the display panel.

In some embodiments, an output end of the timing control circuit of the TCON is electrically connected with the gate driving circuit in the display panel. The data configuration circuit of the TCON, for an example, can supply corresponding signals to the first data input line, the first data-selection control line in the display panel.

In some embodiments, as shown in FIG. 27, the controller first drives to refresh a gaze zone 41 (not refresh non-gaze zone at this moment), and then drives to refresh non-gaze zones 42 at both sides. Encode of one display row indicating image coordinates, display modes, lens data, resolution of the gaze zone with no compression, and resolution of the non-gaze zone which is compressed to be ¼ of horizontal pixels/vertical pixels, three of which are spliced and transmitted from top to bottom. In this solution, the gaze zone and non-gaze zone are independently driven, and the highest data compression ratio is 1:10.7.

Taking a multi-viewpoints light field 3D display with 16 viewpoints as an example, resolution of non-gaze zone of which is compressed by ¼, that is, data of 4*4 pixel islands is compressed into data of one pixel island and transmitted to the controller. The controller copies the data of the one pixel island to three adjacent pixel islands and enables four rows of pixel islands in the second direction at the same time. As such, the 4*4 pixel islands in the non-gaze zone are written with the same data of one pixel island.

In some embodiments, for 2D display and multi-viewpoints light field 3D display, a row drive, a column drive and gating drive of a control zone can be achieved via the controller. The row drive can control the gaze zone to be initiated row-by-row, and control multiple rows of the non-gaze zone to be initiated simultaneously. The column drive can control multiple columns to be initiated simultaneously or control multiple columns to be initiated in sequence by controlling the first data-selection circuit. The gating drive of a control zone is realized through a control circuit. For a normal light-field 3D display, the row drive, the column drive and the gating drive of a control zone can be achieved through the controller. The row drive can control the gaze zone to be initiated row-by-row, and control multiple rows of the non-gaze zone to be initiated simultaneously. The column drive can control multiple columns to be initiated column-by-column by controlling the first data-selection circuit. The gating drive of a control zone can perform gating control through a control circuit. In some embodiments, driving modes can be adjusted by the controller in real time.

In some embodiments, the eye-tracking system includes:

an image acquisition circuit including a plurality of first cameras and at least one second camera; resolution of each first camera is higher than resolution of the second camera; each first camera is configured to capture an image of user's eye pupil; the second camera is configured to capture an image of user's face;

a camera calibration circuit configured to calibrate the first cameras and the second camera to obtain an internal parameter matrix and an external parameter matrix of the first cameras and the second camera;

a camera time-division/zone-division control circuit configured to control a capture timing of the plurality of the first cameras in such a way that the plurality of the first cameras capture images in a cyclic alternating manner;

a human face detection circuit configured to search a human-face frame in an image captured by the second camera, and detect a human-face feature point to obtain a human-eye area in the human-face frame, and obtain a space coordinates conversion matrix of the human-eye area according to a mapping relationship between the human-face feature point and a human-face standard model;

an image coordinates switch circuit configured to switch a human-face image coordinate system to a pupil image coordinate system, or from a pupil image coordinate system to a human-face image coordinate system;

a pupil detection circuit configured to calculate pupil coordinates in images captured by the first cameras, obtain the human-eye area in the pupil images by transforming the human-eye area coordinates obtained by the human-face detection circuit to the pupil image coordinate system via the coordinate transform circuit, and obtain pupil coordinates in the pupil image coordinate system by detecting the pupil in the human-eye area;

a space coordinates calculation circuit configured to transform the pupil coordinates to the human-face image coordinate system, and calculate pupil coordinates in 3D space according to a space coordinate transform matrix obtained via the human-face detection circuit;

a spatial sight-tracking circuit configured to determine eyeball-center coordinates according to the pupil coordinates and a preset human-eye model, calculate a direction vector of the pupil coordinates and the eyeball-center coordinates as a line vector, obtain a gaze point where the line of sight intersects with the display panel according to a distance from a human eye to the display panel and an equation of a plane where the display panel is on, and obtain gaze coordinates on the display panel according to the gaze point.

The eye-tracking system provided by some embodiments of the present disclosure with multi-cameras can perform a spatial pupil detection with a variable rates and a calculation for 3D coordinates. The image acquisition circuit includes a plurality of cameras with different resolutions, so that the pupil coordinates in 3D space can be obtained quickly and precisely by means of a human-face detection algorithm a pupil detection algorithm, and a coordinate-system transform algorithm, problems of relative slow detection frame rates, poor detection precision, and small detection areas due to the conventional single camera can be solved so as to improve the precision of determination for gaze zones.

In some embodiments, the image acquisition circuit includes, for an example, three first cameras and one second camera. The first cameras can be infrared (IR) cameras, the second camera can be a RBG camera. For an example, a Field of View (FOV) of the RGB camera is 80°, a frame rate of the RGB camera is 120 frames per second (fps), a resolution of the RGB camera is 640*480. A Field of View (FOV) of middle one of the three first cameras is 30°, a FOV of other two at both side of the middle one, of the three first cameras is 60°, a resolution of the three IR cameras are 1280*960, a frame rate of the IR camera is 30 fps. Further, there are four infrared light emitting didoes in a periphery of each IR camera.

In some embodiments, the camera time-division/zone-division control circuit is configured to control a capture timing for the plurality of the first cameras, to make the plurality of the first cameras capture images in a cyclic alternating manner, and guarantee the eye-tracking system to continuously output spatial pupil coordinates in a uniform time interval.

Figure 28:
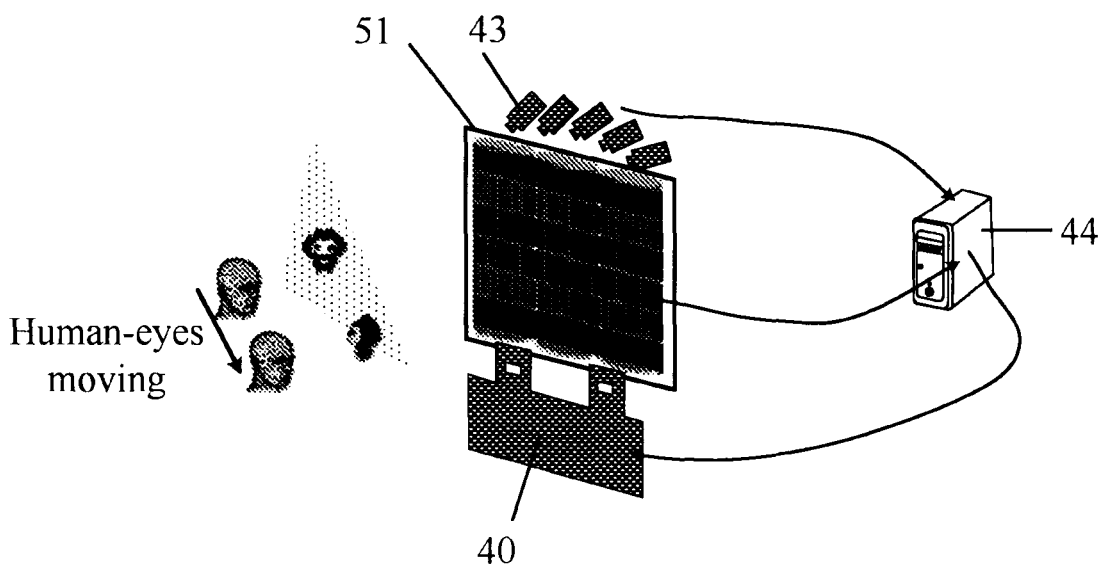
FIG. 28 is a schematic structural diagram of another display device according to an embodiment of the present disclosure.

In some embodiments, as shown in FIG. 28, each camera 43 included in the eye-tracking system is disposed at the top of the display device.

In some embodiments, as shown in FIG. 28, the display device further includes an image rendering system 44 electrically connected with the controller 40 and display panel 51.

In some embodiments, the image rendering system includes:

a coordinate extraction circuit configured to determine 3D space coordinates of the human eyes relative to the display panel according to a position determined by the eye-tracking system, of the human-eye sight on the display panel of the display device;

a lens fitting detection circuit configured to obtain a fitting error of the cylindrical lenses, and adjust fitting detection parameters of the cylindrical lenses according to the fitting error, and obtain a viewpoint crosstalk curve;

an image rendering circuit configured to generate an initial image of multi-viewpoints according to an image to be displayed, and further configured to optimize the initial image according to a human-eye position, the fitting detection parameters and the viewpoint crosstalk curve to obtain optimized image of multi-viewpoints as the image to be displayed.

In the display device provided by embodiments of the present disclosure, the image rendering system matches with the eye-tracking system to determine 3D space coordinates of the human eye relative to the display panel. The display device is provided with the lens fitting detection circuit, so as to obtain the fitting error and crosstalk based on the visual lens fitting detection for the display device, and optimize relative parameters for following image rendering, so that the image rendering is more precise and the display effect is improved.

In some embodiments, the image rendering system further includes a sub-pixel mapping and control circuit configured to map the image to be displayed which is optimized by the image rendering circuit to 3D image sub-pixels and controllers and determine a control strategy.

In some embodiments, the lens fitting detection circuit operates as following: first, determining lens fitting parameters according to an optical grating fitting theory; then initiating a capturing position of camera after determining a display mode; and determining the lens fitting parameters and viewpoints crosstalk curve at the same time.

Here, the determining lens fitting parameters, includes:

implementing following steps repeatedly until an analysis result of image analysis satisfies a preset requirement: adjusting the fitting parameters according to a capturing result of the camera, capturing images again by using the camera, and performing the image analysis including a brightness uniformity analysis;

determining a current fitting parameter as a final lens fitting parameter in response to the analysis result satisfying the preset requirement.

Here, the determining the viewpoints crosstalk, includes:

implementing following steps repeatedly until an analysis result of image analysis satisfies a preset condition: displaying different viewpoint images, capturing images through a camera, and performing an image analysis including a crosstalk curve fitting;

determining a current fitting crosstalk curve as a viewpoint crosstalk curve in response to the analysis result satisfying the preset condition.

In some embodiments, for an example, a following equation of viewpoint crosstalk curve can be used to perform the crosstalk curve fitting:

$$F(x, y) \begin{cases} F_{1(x,y)} & \text{Level 1 crosstalk} \\ F_{2(x,y)} & \text{Level 2 crosstalk} \end{cases},$$

where, x indicates a position coordinate of a sub-pixel in the first direction, y indicates a position coordinate of sub-pixels in the second direction.

It should be noted that a 3D image rendering should be performed by the image rendering system when the display mode is determined as a 3D display by the controller. When the display mode is determined as a 2D display, it is unnecessary to perform the image rendering.

The display device provided by the present disclosure can be a television, a display monitor and any products/elements with displaying function. For the display device, it should be known by a person skilled in the art that other essential components are included in the display device, thus description for these essential components should is omitted, and should not be used to limit the present disclosure. The implementation for the display device can refer to some embodiments of aforementioned display panel, thus repeated description is omitted.

Figure 29:
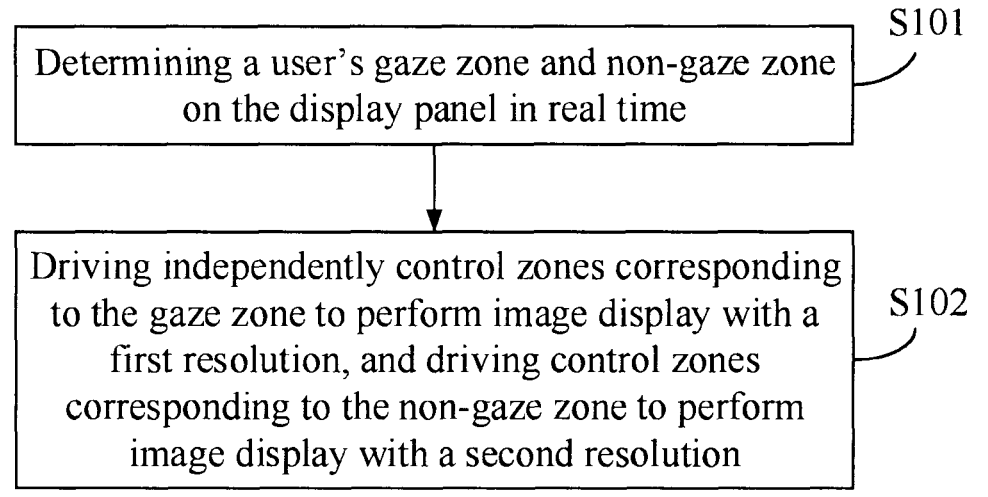
FIG. 29 is a schematic flow diagram of a driving method for a display device according to an embodiment of the present disclosure.

Based on the same inventive idea, some embodiments of the present disclosure further provide a method for driving a display device. As shown in FIG. 29, the method includes:

S101: determining a user's gaze zone and non-gaze zone on the display panel in real time;

S102: independently driving control zones corresponding to the gaze zone to perform image display with a first resolution, driving control zones corresponding to the non-gaze zone to perform image display with a second resolution, where the first resolution is greater than the second resolution.

In some embodiments, the determining a user's gaze zone and non-gaze zone on the display panel in real time in S101, includes:

determining the gaze zone of the user's eyes on the display device through the eye-tracking system;

determining zones except the gaze zone on the display device as the non-gaze zones.

In some embodiments, the determining the gaze zone of the user's eyes on the display device through the eye-tracking system, includes:

controlling the first cameras in the eye-tracking system to capture a user pupil image in a cyclic alternating manner, and controlling the second camera in the eye-tracking system to capture a user face image;

searching for a human-face frame in the image captured by the second camera, and detecting human-face feature points to obtain a human-eye area in the human-face frame, and obtaining a space coordinates transform matrix of the human-eye area according to a mapping relationship between the human-face feature points and the human-face standard model;

switch a human-face image coordinate system to a pupil image coordinate system, or switch a pupil image coordinate system to a human-face image coordinate system;

calculating the pupil coordinates in the image captured by the first cameras, transforming coordinates of the human-eye area to the pupil image coordinate system to obtain the human-eye area in the pupil image, and performing a pupil detection in the human-eye area in the pupil image to obtain pupil coordinates in the pupil image coordinate system;

transforming the pupil coordinates into the human-face image coordinate system, calculating pupil coordinates in 3D space according to the space coordinate transform matrix;

determining the eyeball center coordinates according to the pupil coordinates and a preset eyeball model;

calculating a direction vector of the pupil coordinates and the eyeball center coordinates as the line vector;

obtaining a point where the line of sight intersects with the display panel according to a distance from the human eyes to the display panel and an equation of plane where the display panel is;

obtaining coordinates of the gaze point on the display panel according to the gaze point, and determining a zone where the coordinates of gaze point is on the display panel as the gaze zone.

In some embodiments, for an example, while the second camera is capturing an image, the capturing time sequence of the plurality of the first cameras can be controlled by the camera time-division/zone-division control circuit so as to make the plurality of the first cameras capture images in a cyclic alternating manner.

In some embodiments, the independently driving control zones corresponding to the gaze zone to perform image display with a first resolution, driving control zones corresponding to the non-gaze zone to perform image display with a second resolution, includes:

determining display information of each sub-pixel of a pixel island in the control zone corresponding to the gaze zone according to the display mode, the gaze zone and non-gaze zone, and determining display information of each sub-pixel of the pixel in the control zone corresponding to the non-gaze zone according to the display mode, the gaze zone and non-gaze zone;

according to the display information, supplying data signals corresponding to the display information to the first data input line, supplying the first data-selection control signal to the first data-selection control line, supplying data signals from the first data input line to the data lines corresponding to the first data-selection circuit through the first data-selection circuit.

In a case that the multiplexer includes f transistors, in some embodiments, when each sub-pixel in one sub-pixel row of the pixel island corresponds to one viewpoint, and each first data-selection circuit includes a first multiplexer and a second multiplexer, the first multiplexer includes f third transistors, the second multiplexer includes f fourth transistors; supplying the first data-selection control signals to the first data-selection control line, and supplying the data signals from the first data input line to the data line corresponding to the first data-selection circuit through the first data-selection circuit, includes:

supplying the first data-selection control signal to a plurality of first data-selection control lines electrically connected with the third transistors, to turn on the f third transistors in each first data-selection circuit in sequence, transmitting data signals of the first data input line electrically connected with the first ends of the f third transistors to the data lines electrically connected with the second ends of the f third transistors; and supplying the second data-selection control signal to a plurality of first data-selection control lines electrically connected with the each fourth transistor, to turn off f fourth transistors in each first data-selection circuit.

In some embodiments, when the third transistor and the fourth transistor are of the same transistor type, the first data-selection control signal for turning on a transistor is a high level signal, the second data-selection control signal for turning off a transistor is a low level signal. Alternatively, the first data-selection control signal for turning on the a transistor is a low level signal, the second data-selection control signal for turning off the transistor is a high level signal.

In some embodiments, each row of sub-pixels in a pixel island is divided into a quantity a of sub-pixel groups, a=h/f, each sub-pixel group includes f adjacent sub-pixels. When the f adjacent sub-pixels in one sub-pixel row of the pixel island correspond to one viewpoint, and each first data-selection circuit includes the first multiplexer and the second multiplexer, the first multiplexer includes f third transistors, the second multiplexer includes f fourth transistors, supplying the first data-selection control signal to the first data-selection control line, and supplying data signal from the first data input line to data liens corresponding to the first data-selection circuit through the first data-selection circuit, includes:

when the display information of each sub-pixel in each sub-pixel group are the same, supplying the first data-selection control signal to f first data-selection control lines electrically connected with the third transistors, to turn on f third transistors in each first data-selection circuit at the same time, transmitting data signals from the first data input line electrically connected with first ends of the f third transistors to data lines electrically connected with second ends of the f third transistors, and supplying the second data-selection control signal to f first data-selection control lines electrically connected with the fourth transistors to turn off the f fourth transistors in each first data-selection circuit.

In some embodiments, each row of sub-pixels in a pixel island are divided into a sub-pixel groups, a=h/f, each sub-pixel group includes f adjacent sub-pixels. When f adjacent sub-pixels in one sub-pixel row of the pixel island correspond to one viewpoint, and each first data-selection circuit includes the first multiplexer and the second multiplexer, the first multiplexer includes f third transistors, the second multiplexer includes f fourth transistors, supplying first data-selection control signals to the first data-selection control lines, and supplying the data signals from the first data input lines to the data lines corresponding to the first data-selection circuit via the first data-selection circuit, further includes:

in a part of sub-pixel groups, when the first sub-pixel to the (g−1)th sub-pixel have the same display information, the g-th sub-pixel to the f-th sub-pixel have the same display information, and display information of the (g−1)th sub-pixel is different from display information of the g-th sub-pixel, supplying the first data-selection control signal to the first data-selection control lines electrically connected with the first one to the (g−1)th one of the fourth transistors and the g-th one to f-th one of the third transistors, to turn on the first one to the (g−1)th one of the fourth transistors and the g-th one to the f-th one of the third transistors in each first data-selection circuit at the same time; transmitting data signals of the first data input line electrically connected with the first ends of the first one to the (g−1)th one of fourth transistors and the first ends of the g-th one of the f-th one of the third transistors to data lines electrically connected with the second ends of the first one to the (g−1)th one of the fourth transistors and the second ends of the g-th one of the f-th one of the third transistors; and supplying the second data-selection control signal to the first data-selection control lines electrically connected with the first one to the (g−1)th one of the third transistors and the g-th one of the f-th one of the fourth transistors to turn off the first one to the (g−1)th one of the third transistors and the g-th one to the f-th one of the fourth transistors in each first data-selection circuit.

The method for driving a display device according to the present disclosure can make the display information of sub-pixels be smoothly translated along with the human-eye movement, when the gaze position is changed, so as to improve the display effect, prompt user's experiences.

In a case that the multiplexer includes f switch circuits, in some embodiments, supplying the data signal corresponding to the display information to the first data input line, includes:

supplying the data signal corresponding to the display information and including an gating level to the first data input line.

In some embodiments, when each sub-pixel in one sub-pixel row of the pixel island corresponds to one viewpoint, and each first data-selection circuit includes the first multiplexer and the second multiplexer, the first multiplexer includes f first switch circuits, the second multiplexer includes f second switch circuits, supplying the first data-selection control signal to the first data-selection control line, supplying data signals from the first data input line to the data lines corresponding to the first data-selection circuit through the first data-selection circuit, includes:

supplying the first data-selection control signals to a plurality of first data-selection control lines electrically connected with the first switch circuits to turn on the fifth transistors in f first switch circuits of each first data-selection circuit in sequence; transmitting data signals of the first data input line electrically connected with f first switch circuits to data lines electrically connected with f first switch circuits under the control of data signals including a gating level; and supplying the second data-selection control signal to a plurality of first data-selection control lines electrically connected with the second switch circuits to turn off the fifth transistors in f second switch circuits of each first data-selection circuit.

In some embodiments, the first data-selection control signal for turning on the fifth transistors in the switch circuit is a high level signal, the second data-selection control signal for turning off the fifth transistors in the switch circuit is a low level signal. Alternatively, the first data-selection control signal for turning on the fifth transistors in the switch circuit is a low level signal, the second data-selection control signal for switching off the fifth transistors in the switch circuit is a high level signal.

In some embodiments, each row of sub-pixels in the pixel island is divided into a quantity a of sub-pixel groups, a=h/f, each sub-pixel group includes f adjacent sub-pixels. When f adjacent sub-pixels of one sub-pixel group in the pixel island correspond to one viewpoints, and each first data-selection circuit includes the first multiplexer and the second multiplexer, the first multiplexer includes f first switch circuits, the second multiplexer includes f second switch circuits; supplying the first data-selection control signal to the first data-selection control line, supplying the data signal from the first data input line to the data lines corresponding to the first data-selection circuit through the first data-election circuit, includes:

when the display information of each sub-pixel in each sub-pixel group are the same, supplying the first data-selection control signal to f first data-selection control lines electrically connected with the first switch circuits to turn on the fifth transistors of the f first switch circuits in each first data-selection circuit at the same time, transmitting data signals of the first data input lines electrically connected with the f first switch circuits to the data lines electrically connected with the f first switch circuits under the control of data signals including a gating level, and supplying the second data-selection control signal to the f first data-selection control lines electrically connected with the second switch circuits to turn off the fifth transistors of the f second switch circuits in each first data-selection circuit.

In some embodiments, each row of sub-pixels in the pixel island is dived into a quantity a of sub-pixel groups, a=h/f, each sub-pixel group includes f adjacent sub-pixels. When f adjacent sub-pixels in one sub-pixel row of the pixel island correspond to one viewpoint, and each first data-selection circuit includes the first multiplexer and the second multiplexer, the first multiplexer includes f first switch circuits, the second multiplexer includes f second switch circuits; supplying the first data-selection control signal to the first data-selection control line, supplying the data signal from the first data input line to the data lines corresponding to the first data-selection circuit through the first data-selection circuit, further includes:

in a part of sub-pixel groups, when the first sub-pixel to the (g−1)th sub-pixel have the same display information, the g-th sub-pixel to the f-th sub-pixel have the same display information, and display information of the (g−1)th sub-pixel is different from display information of the g-th sub-pixel, supplying the first data-selection control signal to the first data-selection control lines electrically connected with the first one to the (g−1)th one of the second switch circuits and the g-th one to f-th one of the first switch circuits, to turn on the fifth transistors in the first one to the (g−1)th one of the second switch circuits and fifth transistors in the g-th one to the f-th one of the first switch circuits in each first data-selection circuit at the same time; transmitting data signals of the first data input lines electrically connected with the first one to the (g−1)th one of second switch circuits and the g-th one of the f-th one of the first switch circuits to data lines electrically connected with the first one to the (g−1)th one of the second switch circuits and the g-th one of the f-th one of the first switch circuits; and supplying the second data-selection control signal to the first data-selection control lines electrically connected with the first one to the (g−1)th one of the first switch circuits and the g-th one of the f-th one of the second switch circuits to turn off the fifth transistors in the first one to the (g−1)th one of the first switch circuits and the fifth transistors in the g-th one to the f-th one of the second switch circuits in each first data-selection circuit.

In some embodiments, independently driving the gaze zone to perform image display with the first resolution, and driving the non-gaze zone to perform image display with the second resolution, further includes:

supplying a gate drive signal to a gate drive circuit of the display panel through the controller of the display device to scan multiple rows of pixel islands corresponding to the gaze zone row-by-row, and to scan F rows of multiple pixel islands corresponding to the non-gaze zone at the same time, where F is a positive integer, and F is equal to a ratio of the first resolution to the second resolution.

Figure 30:
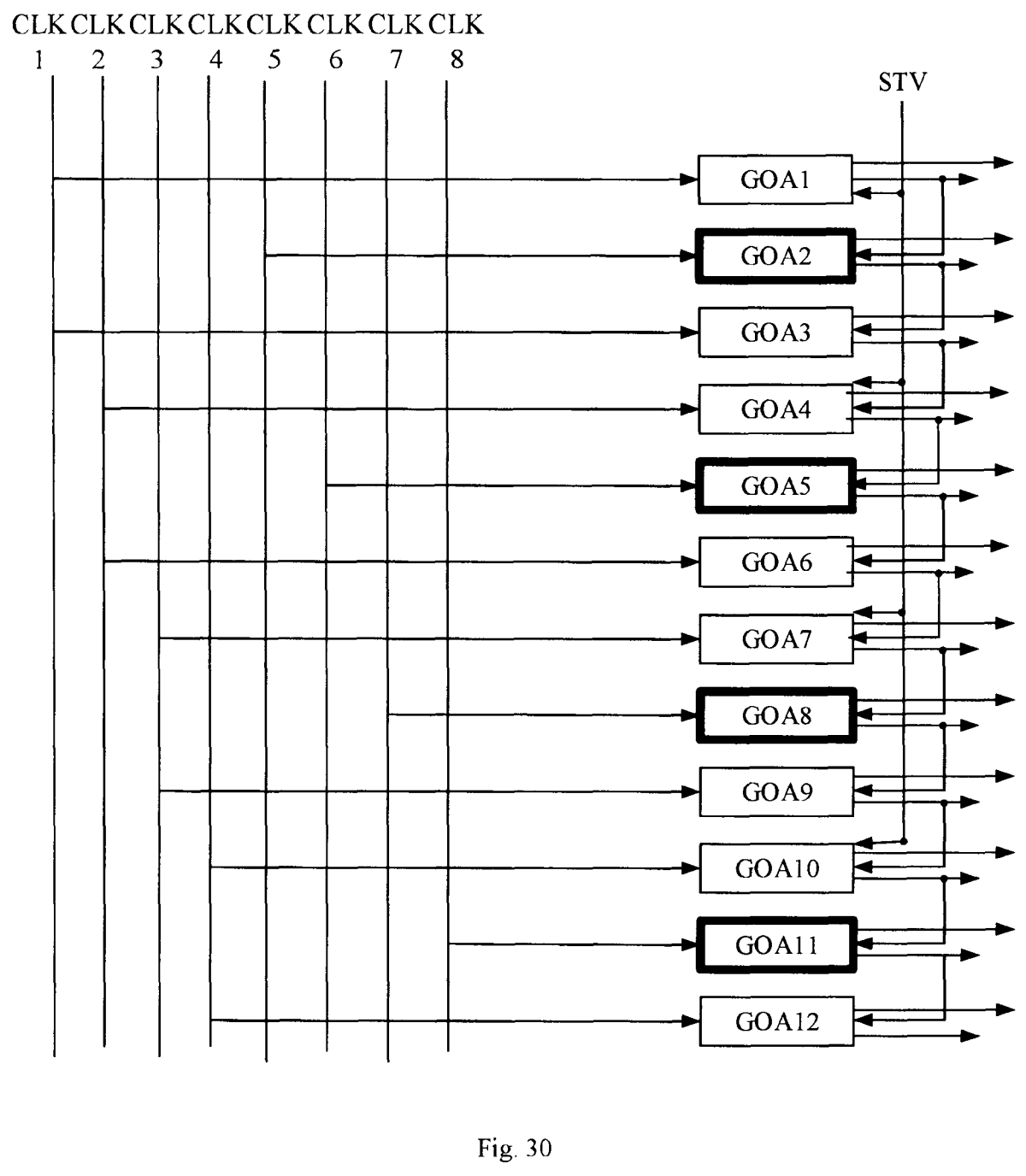

In some embodiments, as shown in FIG. 30, the gate drive circuit of the display panel includes a plurality of gate drive groups. Each of the gate drive groups includes B gate drive sub-groups. Each of the gate drive sub-groups includes C shifting registers, where B and C are integers greater than 1.

Supplying the gate drive signal to the gate drive circuit of the display panel through the controller of the display device, includes:

supplying a clock control signal to the gate drive group through the controller in such a way that an initiating signal can be input into the shifting registers of the gate drive sub-groups in sequence according to an order from the first to the B-th gate drive sub-groups in each gate drive group.

In some embodiment, taking each sub-pixel row in the pixel island including 12 sub-pixels as an example, as shown in FIG. 30, one gate drive group includes three gate drive sub-groups, each of the gate drive sub-groups include four shifting registers GOA. The first gate drive sub-group includes shifting registers GOA1, GOA4, GOA7 and GOA10. The second gate drive sub-group includes shifting registers GOA2, GOA5, GOA8 and GOA11. The third gate drive sub-group includes shifting registers GOA3, GOA6, GOA9 and GOA12. In some embodiments, as shown in FIG. 30, the first gate drive sub-group is electrically connected with eight clock signal lines CLK1, CLK2, CLK3, CLK4, CLK5, CLK6, CLK7 and CLK8. A start signal line STV is electrically connected with the shifting registers GOA1, GOA4, GOA7 and GOA10 in the first gate drive sub-group, that is, pixel islands corresponding to the shifting registers GOA1, GOA4, GOA7 and GOA10 are scanned row-by-row, then, pixel islands corresponding to the shifting registers GOA2, GOA5, GOA8 and GOA11 are scanned row-by-row, after then pixel islands corresponding to the shifting registers GOA3, GOA6, GOA9 and GOA12 are scanned row-by-row. Such a configuration can save system resources of the display device.

Figure 31:
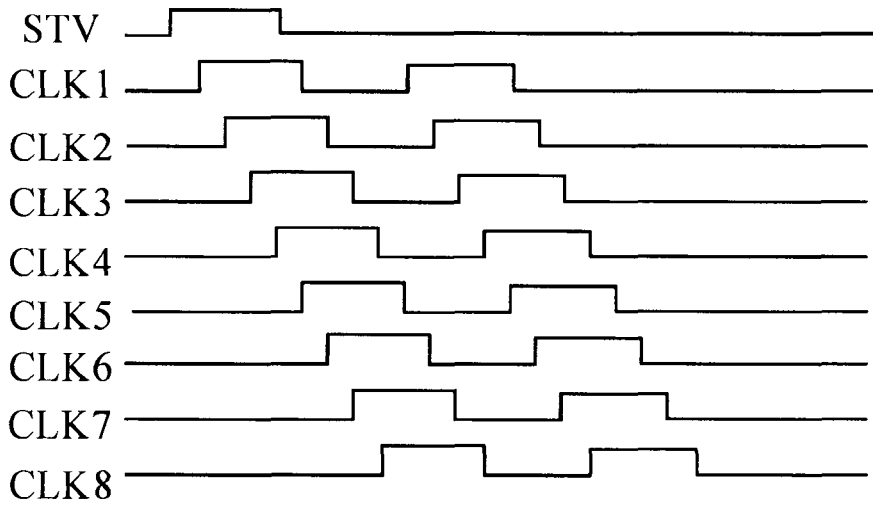
FIG. 31 is a timing chart of a gate drive circuit according to an embodiment of the present disclosure.
Figure 32:
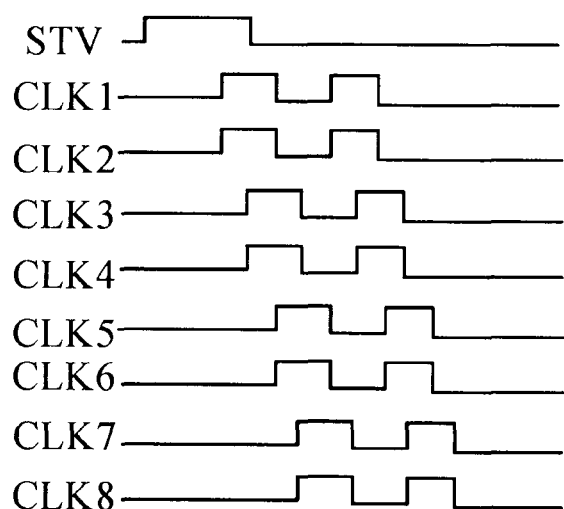
FIG. 32 is a timing chart of another gate drive circuit according to an embodiment of the present disclosure.

FIG. 31 shows a timing chart of scanning pixel islands row-by-row using the gate drive circuit. FIG. 32 shows a timing chart of scanning two rows of pixel islands at the same time using the gate drive circuit.

In some embodiments, the method further includes:

driving the gaze zone to perform image display with the first refreshing rate, and driving the non-gaze zone to perform image display with the second refreshing rate, the first refreshing rate is greater than the second refreshing rate.

In some embodiments, driving the gaze zone to perform image display with the first refreshing rate, and driving the non-gaze zone to perform image display with the second refreshing rate, includes:

driving each sub-pixel in the gaze zone to be refreshed by Z times;

driving each sub-pixel in the non-gaze zone to be refreshed by Y times;

here, Z and Y are positive integers, and Z is greater than Y.

In some embodiments, driving each sub-pixel in the gaze zone to be refreshed, includes:

driving each scanning signal input line corresponding to the gaze zone to transmit active level signals in sequence;

controlling each control signal line to transmit a control signal, and transmitting signals from the scanning signal input lines to scanning lines corresponding to the gaze zone, and transmitting signals from the fixed potential line to scanning lines corresponding to the non-gaze zone.

Driving each sub-pixel in the non-gaze zone to be refreshed, includes:

driving each scanning signal input line in the display panel to transmit an active level signal in sequence;

while sub-pixels corresponding to the gaze zone are scanned, controlling each control signal line to transmit a control signal, transmitting signals from the fixed potential line to scanning lines corresponding to the gaze zone, transmitting signals from the scanning signal input line to scanning lies corresponding to the non-gaze zone.

In some embodiments, when the control end of the first transistor and the control end of the second transistor are electrically connected with the same control signal line, controlling each control signal line to transmit the control signal, and transmitting signals from the scanning signal input lines to scanning lines corresponding to the gaze zone, and transmitting signals supplied by the fixed potential line to scanning lines corresponding to the non-gaze zone, includes:

driving each control signal line in the gaze zone to transmit the first control signal, driving each control signal line in the non-gaze zone to transmit the second control signal to turn on the first transistor in the gaze zone, to turn off the second transistor in the gaze zone, to turn off the first transistor in the non-gaze zone, to turn on the second transistor in the non-gaze zone; transmitting the signal supplied by the scanning signal input line through the first transistors in the control zone to scanning lines corresponding to the control zone, and transmitting the signal supplied by the fixed potential line through the second transistors in the non-gaze zone to scanning lines corresponding to the non-gaze zone.

When each sub-pixel row corresponding to the gaze zone is scanned, controlling each control signal line to transmit the control signal, transmitting the signal supplied by the fixed potential line to scanning lines corresponding to the gaze zone, and transmitting the signal supplied by the scanning signal input line to scanning lines corresponding to the non-gaze zone, includes:

driving each control signal line in the gaze zone to transmit the second control signal, driving each control signal line in the non-gaze zone to transmit the first control signal to turn off the first transistor in the gaze zone, turn on the second transistor in the gaze zone, turn on the first transistor in the non-gaze zone, and turn off the second transistor in the non-gaze zone; transmitting the signal supplied by the scanning signal input line to the scanning lines corresponding to the non-gaze zone through the first transistors in the non-gaze zone, and transmitting the signal supplied by the fixed potential line to scanning lines corresponding to the gaze zone through the second transistors in the gaze zone.

In some embodiments, when the first transistor is a P-type transistor, the second transistor is an N-type transistor, the first control signal is a low level signal, the second control signal is a high level signal; when the first transistor is an N-type transistor, the second transistor is a P-type transistor, the first control signal is a high level signal, the second control signal is a low level signal.

In some embodiments, when the control end of the first transistor is electrically connected with the first control signal line, the control end of the second transistor is electrically connected with the second control signal line, controlling each control signal line to transmit the control signal, transmitting the signal supplied by the scanning signal input line to scanning lines corresponding to the gaze zone, transmitting the signal supplied by the fixed potential line to scanning lines corresponding to the non-gaze zone, includes:

driving each first control signal line in the gaze zone to transmit the first control signal, driving each second control signal in the gaze zone to transmit the second control signal, driving each first control signal line in the non-gaze zone to transmit the third control signal, driving each second control signal line in the non-gaze zone to transmit the fourth control signal, to turn on the first transistor in the gaze zone, turn off the second transistor in the gaze zone, turn off the first transistor in the non-gaze zone, turn on the second transistor in the non-gaze zone, transmitting the signal supplied by the scanning signal input line to scanning lines corresponding to the control zone through the first transistors in the control zone, and transmitting the signal supplied by the fixed potential line to scanning lines corresponding to the non-gaze zone through the second transistors in the non-gaze zone.

When each sub-pixel row corresponding to the gaze zone is scanned, controlling each control signal line to transmit the control signal, transmitting the signal supplied by the fixed potential line to scanning lines corresponding to the gaze zone, transmitting the signal supplied by scanning signal input line to scanning lines corresponding to the non-gaze zone, includes:

driving each first control signal line in the gaze zone to transmit the third control signal, driving each second control signal line in the gaze zone to transmit the fourth control signal, driving each first control signal line in the non-gaze zone to transmit the first control signal, driving each second control signal line in the non-gaze zone to transmit the second control signal, to turn off the first transistor in the gaze zone, turn on the second transistor in the gaze zone, turn on the first transistor in the non-gaze zone, turn off the second transistor in the non-gaze zone, transmitting the signal supplied by the scanning signal input line to scanning lines corresponding to a non-gaze zone through the first transistor in the non-gaze zone, and transmitting the signal supplied by the fixed potential line to scanning lines corresponding to the gaze zone through the second transistor in the gaze zone.

In some embodiments, when the first transistor and the second transistor are P-type transistors, the first control signal and the fourth control signal are low level signals, the second control signal and the third control signal are high level signals. When the first transistor and the second transistor are N-type transistors, the first control signal and the fourth control signal are high level signals, the second control signal and the third control signal are low level signals. When the first transistor is a P-type transistor, the second transistor is an N-type transistor, the first control signal and the second control signal are low level signals, the third control signal and the fourth control signal are high level signals. When the first transistor is an N-type transistor, the second transistor is a P-type transistor, the first control signal and the second control signal are high level signals, the third control signal and the fourth control signal are low level signals.

Base on the same inventive idea, some embodiments of the present disclosure further provides a method applied to a display device for rendering images. As shown in FIG. 33, the method includes:

S201: determining a gaze position on a display panel of a display device, and determining 3D space coordinates of human-eyes relative to the display panel;

S202: generating an initial image of multi-viewpoints according to an image to be displayed;

S203: performing a fitting detection for a cylindrical lenses array on the display device, and obtaining a fitting error of the cylindrical lenses and a viewpoint crosstalk curve;

S204: optimizing the initial image of multi-viewpoints according to a human-eye position, a fitting detection parameter and the viewpoint crosstalk curve, obtaining an optimized image of multi-viewpoints;

S205: transmitting the optimized image of multi-viewpoints to a controller.

The method for rendering images provided by embodiments of the present disclosure uses the image rendering system coordinating with the eye-tracking system to determine 3D space coordinates of the human eye relative to the display panel, uses the lens fitting detection circuit to obtain the fitting error and crosstalk based on the visual lens fitting detection for the display device, and optimizes relative parameters for following image rendering, so that the image rendering is more precise and the display effect is improved.

In summary, in the display panel, display device, driving method therefor and image rendering method for the display device, the pixel islands are divided into a plurality of control zones, each control zone can be independently driven to emit light, so that the resolutions and refresh rates of the display panel can be controlled in zones according to display images. When the resolutions of the display panel are controlled in zones, the display panel can be divided into a high-definition zone, and a low-definition zone. The resolutions of the high-definition zone are greater than the resolutions of the low-definition zone. For an example, the resolutions of gaze zone can be increased to improve the display effect. When the refresh rate of the display panel is controlled in zones, the display panel can be divided into a high-refresh zone and a low-refresh zone, so as to save the power consumption of display products.

Although the preferred embodiments of the present disclosure have been described, those skilled in the art can make additional alterations and modifications to these embodiments once they know the basic creative concept.

Thus, it is intended that the appended claims are to be interpreted as including the preferred embodiments and all alterations and modifications falling within the scope of the present disclosure.

Apparently, those skilled in the art can make various modifications and variations to the embodiments of the present disclosure without departing from the spirit and scope of the embodiments of the present disclosure. In this way, if these modifications and variations to the embodiments of the present disclosure fall within the scope of the claims of the present disclosure and their equivalents, it is intended that the present disclosure also encompass these modifications and variations.

What is claimed is:

1. A display panel, comprising:

a first substrate;

a plurality of scanning lines on a side of the first substrate, wherein the plurality of scanning lines extend in a first direction, and are arranged in a second direction; and the first direction intersects with the second direction;

a plurality of data lines on the side of the first substrate where the plurality of scanning lines are, wherein the plurality of data lines extend in the second direction and are arranged in the first direction;

a plurality of sub-pixels in zones divided by the plurality of scanning lines and the plurality of data lines; wherein the plurality of sub-pixels constitute a plurality of pixel islands, the plurality of pixel islands are divided into a plurality of control zones, each of the plurality of control zones comprises at least one pixel island, and each of the plurality of control zones is independently driven to emit light;

wherein the display panel is divided in to a display area and a periphery area surrounding the display area; the pixels islands are in the display area; the scanning liens and the data lines extend from the display area to the periphery area;

wherein the display panel further comprises, in the periphery area, a plurality of first data-selection control lines, a plurality of first data input lines, and a plurality of first data-selection circuits;

wherein each of the first data-selection circuits comprises at least two multiplexers;

in each of the first data-selection circuits, input ends of different multiplexers are electrically connected with different first data input lines; control ends of different multiplexers are electrically connected with different first data-selection control lines; i-th output ends of different multiplexers are electrically connected with a same data line, wherein i is an positive integer;

in two adjacent first data-selection circuits, two multiplexers electrically connected with different first data-selection control lines are electrically connected with a same first data input line;

the first data-selection circuit is configured to supply signals of corresponding first data input lines respectively to the data lines electrically connected with the first data-selection circuit under a control of the plurality of first data-selection control lines.

2. The display panel according to claim 1, further comprising:

a plurality of scanning signal input lines corresponding to the plurality of scanning lines in an one-to-one manner, wherein the plurality of scanning signal input lines extend in the first direction and are arranged in second direction;

a plurality of control signal lines arranged in the first direction;

a plurality of fixed potential lines;

a plurality of control circuits arranged between adjacent sub-pixels, wherein each pixel island is connected with at least n control circuits of the plurality of control circuits, n is a quantity of sub-pixel rows comprised in the each pixel island, and one of the n control circuits correspond to one of the sub-pixel rows of the each pixel island;

wherein the control circuit is configured to transmit a signal from the scanning signal input line or a signal from the fixed potential line to the scanning line;

wherein at least a part of the plurality of control signal lines comprise a plurality of portions extending in the second direction and a plurality of portions extending in the first direction, and the portions extending in the second direction and the portions extending in the first direction are in connection and in an alternating arrangement.

3. The display panel according to claim 2, wherein the control circuit comprises: a first transistor and a second transistor;

wherein a control end of the first transistor is electrically connected with one of the control signal lines, a first end of the first transistor is electrically connected with the scanning signal input line, a second end of the first transistor is electrically connected with the scanning line;

wherein a control end of the second transistor is electrically connected with one of the control signal lines, a first end of the second transistor is electrically connected with the fixed potential line, a second end of the second transistor is electrically connected with the scanning line.

4. The display panel according to claim 3, where the control end of the first transistor and the control end of the second transistor are electrically connected with a same one of the control signal lines;

wherein the first transistor is an N-type transistor, the second transistor is a P-type transistor; or the first transistor is a P-type transistor, the second transistor is an N-type transistor.

5. The display panel according to claim 3, wherein the control end of the first transistor and the control end of the second transistor are electrically connected with different control signal lines.

6. The display panel according to claim 2, further comprising: a gate drive circuit;

wherein the gate drive circuit comprises a plurality of shifting registers in cascade, each of the shifting registers is electrically connected with scanning signal input lines in one row of the control zones.

7. The display panel according to claim 2, wherein each of the scanning lines comprises a plurality of sub-scanning lines, wherein the plurality of sub-scanning lines are arranged in the first direction and disconnected with each other;

a quantity of the sub-scanning lines in each of the scanning lines is equal to a quantity of control zones arranged in the first direction, and each of the sub-scanning lines corresponds to one row of sub-pixels in one of the control zones arranged in the first direction.

8. The display panel according to claim 1, wherein each sub-pixel row in each of the pixel islands comprises h sub-pixels, each sub-pixel row is divided into a quantity a of sub-pixel groups, each sub-pixel group comprises f sub-pixels, wherein a=h/f, a, h and f are positive integers greater than 1;

a plurality of data lines connected with each sub-pixel group are electrically to a same one of the first data-selection circuits, a plurality of data lines connected with different sub-pixel groups are electrically connected with different first data-selection circuits; and each of the multiplexers comprises f output ends, one input end and f control ends.

9. The display panel according to claim 8, wherein each of the first data-selection circuits comprises j multiplexers;

a quantity of the first data-selection control lines is j*f, a quantity of the first data-selection circuits are m, and a quantity of the first data input lines are n, wherein n=m+j−1;

j multiplexers electrically connected with different first data-selection control lines in each j continuous first data-selection circuits are electrically connected with one first data input line, wherein j is a positive integer less than m.

10. The display panel according to claim 9, wherein one of the multiplexers comprises f transistors; control ends of different transistors are electrically connected with different first data-selection control lines; first ends of the different transistors are electrically connected with a same one of the first data input lines; and second ends of the different transistors are electrically connected with different data lines;

in each of the first data-selection circuits, second ends of i-th transistors in different multiplexers are electrically connected with a same one of the data lines.

11. The display panel according to claim 9, wherein one of the multiplexers comprises f switch circuits;

each of the switch circuits comprises a fifth transistor, a sixth transistor, a seventh transistor and a first capacitor;

a control end of the fifth transistor is electrically connected with the first data-selection control line; a first end of the fifth transistor and a first end of the sixth transistor are electrically connected with the first data input line; a second end of the fifth transistor is electrically connected with a control end of the sixth transistor, a control end of the seventh transistor and a first end of the first capacitor; a second end of the sixth transistor and a second end of the seventh transistor are electrically connected with the data line; a second end of the first capacitor is grounded;

wherein the display panel further comprises:

a dummy signal line electrically connected with a first end of the seventh transistor.

12. The display panel according to claim 1, wherein each row of the sub-pixels arranged in the first direction are of a same color;

wherein the display panel further comprises: a light-shielding layer, the light-shielding layer contains a plurality of light-shielding parts extending in the first direction and arranged in the second direction.

13. A display device, comprising:

the display panel according to claim 1;

a cylindrical lens structure arranged on an light-emitting side of the display panel, wherein the cylindrical lens structure comprises a plurality of cylindrical lenses arranged in array;

a controller connected with the display panel and configured to supply an independent drive signal to each of the control zones.

14. The display device according to claim 13, wherein each of the sub-pixel rows in each pixel island comprises h sub-pixels, each pixel island corresponds to N cylindrical lenses, wherein h and N are positive integers, h>N, and h/N is a non-integer.

15. The display device according to claim 14, wherein each of the sub-pixel rows in each pixel island comprises a light-shielding area, a ratio of an area of the sub-pixels to an area of the light-shielding area is X, wherein X=N−1.

16. The display device according to claim 13, wherein the controller comprises:

a data parsing circuit configured to parse an image to be displayed and obtain a parsed image data;

a data configuration circuit configured to generate a data drive signal corresponding to the control zones of the display panel according to a current display mode and the parsed image data;

a timing control circuit configured to generate a gate drive signal for a gate drive circuit according to the current display mode and a gaze zone, a non-gaze zone of the display panel.

17. The display device according to claim 13, further comprising:

an eye-tracking system configured to determine a gaze area for a user's eyes on the display device.

18. The display device according to claim 17, wherein the eye-tracking system comprises:

an image acquisition circuit comprising a plurality of first cameras and at least one second camera; wherein a resolution of each first camera is higher than a resolution of the second camera; each first camera is configured to capture an image of the user's pupil; and the second camera is configured to capture an image of the user's face;

a camera calibration circuit configured to calibrate the first cameras and the second camera and obtain an internal parameter matrix and an external parameter matrix of the first cameras and the second camera;

a camera time-division/zone-division control circuit configured to control a capture timing of the plurality of the first cameras in such a way that the plurality of the first cameras capture images in a cyclic alternating manner;

a human face detection circuit configured to search a human-face frame in the image captured by the second camera, and detect a human-face feature point to determine a human-eye area in the human-face frame, and determine a space coordinates transform matrix of the human-eye area according to a mapping relationship between the human-face feature point and a human-face standard model;

an image coordinates switch circuit configured to switch a human-face image coordinate system to a pupil image coordinate system, or switch a pupil image coordinate system to a human-face image coordinate system;

a pupil detection circuit configured to calculate pupil coordinates in the image captured by the first camera, determine the human-eye area in an pupil image by transforming human-eye area coordinates obtained by the human-face detection circuit to pupil image coordinate system via the image coordinates switch circuit, and determine pupil coordinates in the pupil image coordinate system by detecting the pupil in the human-eye area in the pupil image;

a space coordinates calculation circuit configured to transform the pupil coordinates to the human-face image coordinate system, and calculate pupil coordinates in 3D space via the space coordinate transform matrix obtained through the human-face detection circuit;

a spatial sight-tracking circuit configured to determine eyeball-center coordinates according to the pupil coordinates and a preset human-eye model, calculate a direction vector of the pupil coordinates and the eyeball-center coordinates as a line vector, determine a gaze point on the display panel according to a distance from a human eye to the display panel and an equation of a plane where the display panel is on, and determine coordinates of the gaze point on the display panel according to the gaze point.

19. The display device according to claim 18, further comprising an image rendering system electrically connected with the controller, wherein the image rendering system comprises:

a coordinate extraction circuit configured to determine 3D space coordinates of the human eye relative to the display panel according to a gaze position of a human-eye sight on the display panel of the display device determined by the eye-tracking system;

a lens fitting detection circuit configured to obtain a fitting error of the cylindrical lenses, and adjust fitting detection parameters of the cylindrical lenses according to the fitting error, and obtain a viewpoint crosstalk curve;

an image rendering circuit configured to generate an initial image of multi-viewpoints according to an image to be displayed, and further configured to optimize the initial image of multi-viewpoints according to a human-eye position, the fitting detection parameters and the viewpoint crosstalk curve to obtain optimized image of multi-viewpoints as the image to be displayed.

* * * * *